(12) United States Patent
Yoshida

(10) Patent No.: US 6,266,444 B1
(45) Date of Patent: *Jul. 24, 2001

(54) CHARACTER PROCESSING APPARATUS AND METHOD THEREFOR

(75) Inventor: Masayuki Yoshida, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,931

(22) Filed: Oct. 3, 1997

(30) Foreign Application Priority Data

Oct. 11, 1996 (JP) .................................................. 8-269844
Dec. 27, 1996 (JP) .................................................. 8-351567

(51) Int. Cl.⁷ .............................. G06K 9/00; G06K 9/46; G06T 11/00; G06T 11/20
(52) U.S. Cl. ..................... 382/202; 382/181; 382/199; 382/203; 345/443; 345/469
(58) Field of Search ..................................... 382/181, 202, 382/256, 199, 203; 345/170, 442, 443, 467, 469

(56) References Cited

U.S. PATENT DOCUMENTS

| 4,607,386 | * | 8/1986 | Morita et al. | 382/202 |
| 5,073,956 | * | 12/1991 | Kawamoto et al. | 382/256 |
| 5,426,726 | * | 6/1995 | Horiuchi et al. | 345/467 |
| 5,475,807 | | 12/1995 | Yoshida et al. | 345/170 |
| 5,487,118 | * | 1/1996 | Melen | 382/202 |
| 5,499,332 | | 3/1996 | Yoshida | 345/467 |
| 5,526,440 | * | 6/1996 | Sakano et al. | 382/202 |
| 5,548,701 | | 8/1996 | Yoshida | 345/170 |
| 5,572,602 | * | 11/1996 | Naoi et al. | 382/202 |

* cited by examiner

*Primary Examiner*—Leo Boudreau
*Assistant Examiner*—Daniel G. Mariam
(74) *Attorney, Agent, or Firm*—Fitzpatrick, Cella, Harper & Scinto

(57) ABSTRACT

The present invention intends to generate non-intersecting entire outline data from intersection-involving stroke data at a high speed, thereby outputting characters and graphics of higher quality at a higher speed. Every pair of the strokes are extracted from all the strokes of a registered character, then the curve data of the extracted strokes are straightened, and there is discriminated whether the line segments of the every extracted pair of the strokes mutually intersect. If an intersection is present, the coordinate of such intersection is calculated and stored. Then the outline is re-connected according to a predetermined rule, based on the stored coordinate of intersection.

12 Claims, 20 Drawing Sheets

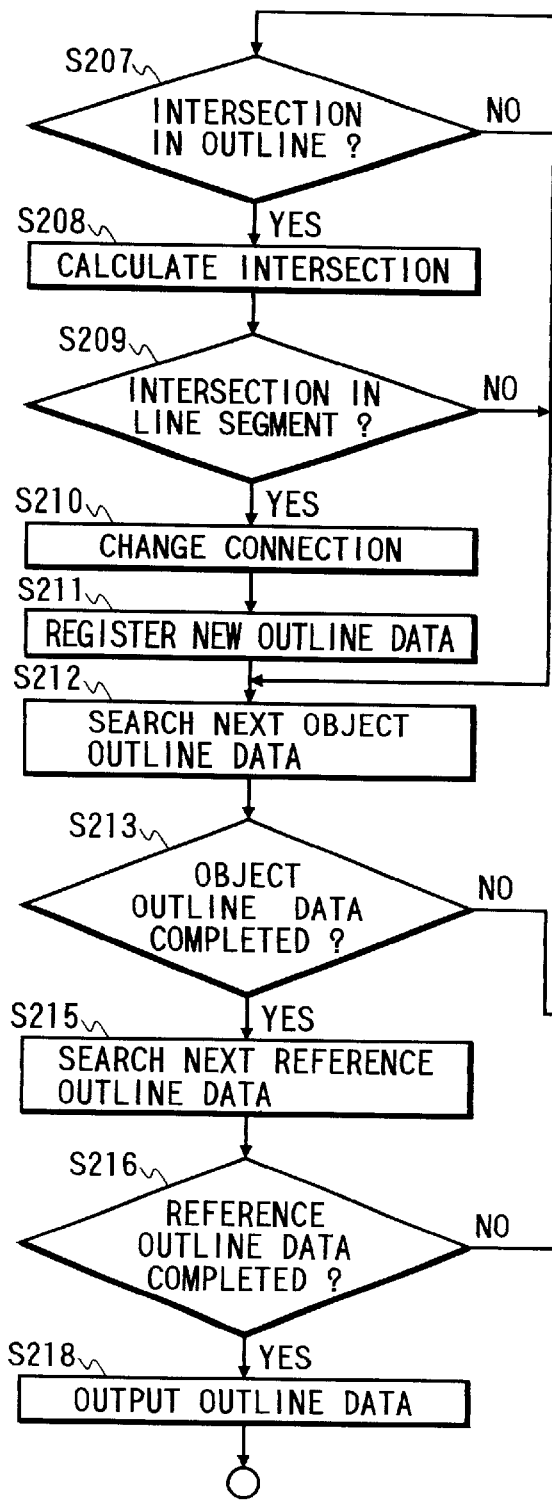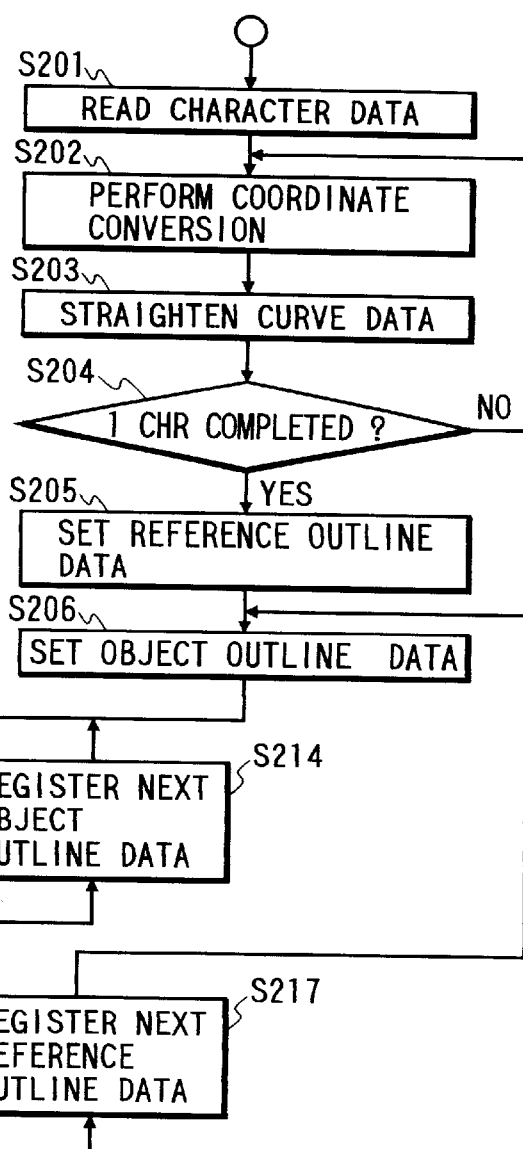
FIG. 4

○ : END POINT
△ : INTERMEDIATE POINT

○ : END POINT
△ : INTERMEDIATE POINT

| CLOCKWISE (1) |
| --- |
| START POINT NO. (0) |
| END POINT NO. (4) |
| STROKE MIN X |
| STROKE MIN Y |
| STROKE MAX X |
| STROKE MAX Y |
| CLOCKWISE (1) |
| START POINT NO. (5) |
| END POINT NO. (9) |
| STROKE MIN X |
| STROKE MIN Y |
| STROKE MAX X |
| STROKE MAX Y |

| | | | | |
| --- | --- | --- | --- | --- |
| 0 | (XA,YA) | – | 1 | A |
| 1 | (XB,YB) | 0 | 2 | B |
| 2 | (XC,YC) | 1 | 3 | C |
| 3 | (XD,YD) | 2 | 4 | D |
| 4 | (XA,YA) | 3 | – | A |
| 5 | (XE,YE) | – | 6 | E |
| 6 | (XF,YF) | 5 | 7 | F |
| 7 | (XG,YG) | 6 | 8 | G |
| 8 | (XH,YH) | 7 | 9 | H |
| 9 | (XE,YE) | 8 | – | E |

| CLOCKWISE (1) |
|---|
| START POINT NO. (0) |
| END POINT NO. (4) |
| STROKE MIN X |
| STROKE MIN Y |
| STROKE MAX X |
| STROKE MAX Y |
| CLOCKWISE (1) |
| START POINT NO. (5) |
| END POINT NO. (9) |
| STROKE MIN X |
| STROKE MIN Y |
| STROKE MAX X |
| STROKE MAX Y |

|  |  |  |  |  |
|---|---|---|---|---|
| 0 | (XA,YA) | – | 1 | A |
| 1 | (XB,YB) | 0 | 2 | B |
| 2 | (XC,YC) | 1 | 3 | C |
| 3 | (XD,YD) | 2 | 4 | D |
| 4 | (XA,YA) | 3 | – | A |
| 5 | (XE,YE) | 8 | 6 | E |
| 6 | (XF,YF) | 5 | 7 | F |
| 7 | (XG,YG) | 6 | 8 | G |
| 8 | (XH,YH) | 7 | 9 | H |
| 9 | (XE,YE) | – | – | E |
| 10 | (Xα1,Yα1) |  |  | α1 |
| 11 | (Xα2,Yα2) |  |  | α2 |
| 12 | (Xβ1,Yβ1) |  |  | β1 |
| 13 | (Xβ2,Yβ2) |  |  | β2 |
| 14 | (Xγ1,Yγ1) |  |  | γ1 |
| 15 | (Xγ2,Yγ2) |  |  | γ2 |
| 16 | (Xδ1,Yδ1) |  |  | δ1 |
| 17 | (Xδ2,Yδ2) |  |  | δ2 |

FIG. 13A

DA–EF INTERSECTION
D→α1→F
E→α2→A

| | | |
|---|---|---|
| 0 | (XA,YA) | – |
| 1 | (XB,YB) | 0 |
| 2 | (XC,YC) | 1 |
| 3 | (XD,YD) | 2 |
| 4 | (XA,YA) | 11 |
| 5 | (XE,YE) | 8 |
| 6 | (XF,YF) | 10 |
| 7 | (XG,YG) | 6 |
| 8 | (XH,YH) | 7 |
| 9 | (XE,YE) | – |
| 10 | (Xα1,Yα1) | 3 |
| 11 | (Xα2,Yα2) | 5 |
| 12 | (Xβ1,Yβ1) | |
| 13 | (Xβ2,Yβ2) | |
| 14 | (Xγ1,Yγ1) | |
| 15 | (Xγ2,Yγ2) | |
| 16 | (Xδ1,Yδ1) | |
| 17 | (Xδ2,Yδ2) | |

Column values (rows 0-17): –,1,2,3,10,–,11,7,8,5,–,6,4

FIG. 13B

BC–α1F INTERSECTION
B→β1→F
α1→β2→C

| | | |
|---|---|---|
| 0 | (XA,YA) | – |
| 1 | (XB,YB) | 0 |
| 2 | (XC,YC) | 13 |
| 3 | (XD,YD) | 2 |
| 4 | (XA,YA) | 11 |
| 5 | (XE,YE) | 8 |
| 6 | (XF,YF) | 12 |
| 7 | (XG,YG) | 6 |
| 8 | (XH,YH) | 7 |
| 9 | (XE,YE) | – |
| 10 | (Xα1,Yα1) | 3 |
| 11 | (Xα2,Yα2) | 5 |
| 12 | (Xβ1,Yβ1) | 1 |
| 13 | (Xβ2,Yβ2) | 10 |
| 14 | (Xγ1,Yγ1) | |
| 15 | (Xγ2,Yγ2) | |
| 16 | (Xδ1,Yδ1) | |
| 17 | (Xδ2,Yδ2) | |

Second value column (rows 0-13): –,1,12,3,10,–,11,7,8,5,–,13,4,6,2

FIG. 13C

β2C–GH INTERSECTION
β2→γ1→H
G→γ2→C

| | | |
|---|---|---|
| 0 | (XA,YA) | – |
| 1 | (XB,YB) | 0 |
| 2 | (XC,YC) | 15 |
| 3 | (XD,YD) | 2 |
| 4 | (XA,YA) | 11 |
| 5 | (XE,YE) | 8 |
| 6 | (XF,YF) | 12 |
| 7 | (XG,YG) | 6 |
| 8 | (XH,YH) | 14 |
| 9 | (XE,YE) | – |
| 10 | (Xα1,Yα1) | 3 |
| 11 | (Xα2,Yα2) | 5 |
| 12 | (Xβ1,Yβ1) | 1 |
| 13 | (Xβ2,Yβ2) | 10 |
| 14 | (Xγ1,Yγ1) | 13 |
| 15 | (Xγ2,Yγ2) | 7 |
| 16 | (Xδ1,Yδ1) | |
| 17 | (Xδ2,Yδ2) | |

Second value column (rows 0-15): –,1,12,3,10,–,11,7,8,5,–,13,4,6,14,8,2

FIG. 13D

Dα1–γ1H INTERSECTION
D→δ1→H
γ1→δ2→α1

| | | |
|---|---|---|
| 0 | (XA,YA) | – |
| 1 | (XB,YB) | 0 |
| 2 | (XC,YC) | 15 |
| 3 | (XD,YD) | 2 |
| 4 | (XA,YA) | 11 |
| 5 | (XE,YE) | 8 |
| 6 | (XF,YF) | 12 |
| 7 | (XG,YG) | 6 |
| 8 | (XH,YH) | 16 |
| 9 | (XE,YE) | – |
| 10 | (Xα1,Yα1) | 17 |
| 11 | (Xα2,Yα2) | 5 |
| 12 | (Xβ1,Yβ1) | 1 |
| 13 | (Xβ2,Yβ2) | 10 |
| 14 | (Xγ1,Yγ1) | 13 |
| 15 | (Xγ2,Yγ2) | 7 |
| 16 | (Xδ1,Yδ1) | 3 |
| 17 | (Xδ2,Yδ2) | 15 |

Second value column (rows 0-17): 1,12,3,16,–,11,7,15,5,–,13,4,6,14,17,2,8,10

FIG. 14A

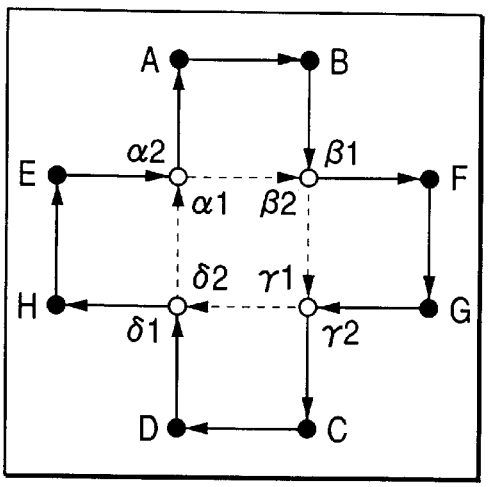

FIG. 14B

| |
|---|
| CLOCKWISE (1) |
| START POINT NO. (0) |
| END POINT NO. (4) |
| STROKE MIN X |
| STROKE MIN Y |
| STROKE MAX X |
| STROKE MAX Y |
| CLOCKWISE (1) |
| START POINT NO. (−1) |
| END POINT NO. (−1) |
| STROKE MIN X |
| STROKE MIN Y |
| STROKE MAX X |
| STROKE MAX Y |
| CLOCKWISE (1) |
| START POINT NO. (10) |
| END POINT NO. (18) |
| STROKE MIN X |
| STROKE MIN Y |
| STROKE MAX X |
| STROKE MAX Y |

FIG. 14C

| | | | |
|---|---|---|---|
| 0 | $(X_A, Y_A)$ | − | 1 |
| 1 | $(X_B, Y_B)$ | 0 | 12 |
| 2 | $(X_C, Y_C)$ | 15 | 3 |
| 3 | $(X_D, Y_D)$ | 2 | 6 |
| 4 | $(X_A, Y_A)$ | 11 | − |
| 5 | $(X_E, Y_E)$ | 8 | 11 |
| 6 | $(X_F, Y_F)$ | 12 | 7 |
| 7 | $(X_G, Y_G)$ | 6 | 15 |
| 8 | $(X_H, Y_H)$ | 16 | 5 |
| 9 | $(X_E, Y_E)$ | − | − |
| 10 | $(X_{\alpha 1}, Y_{\alpha 1})$ | − | 13 |
| 11 | $(X_{\alpha 2}, Y_{\alpha 2})$ | 5 | 4 |
| 12 | $(X_{\beta 1}, Y_{\beta 1})$ | 1 | 6 |
| 13 | $(X_{\beta 2}, Y_{\beta 2})$ | 10 | 14 |
| 14 | $(X_{\gamma 1}, Y_{\gamma 1})$ | 13 | 17 |
| 15 | $(X_{\gamma 2}, Y_{\gamma 2})$ | 7 | 2 |
| 16 | $(X_{\delta 1}, Y_{\delta 1})$ | 3 | 8 |
| 17 | $(X_{\delta 2}, Y_{\delta 2})$ | 15 | 18 |
| 18 | $(X_{\alpha 1}, Y_{\alpha 1})$ | 17 | − |

FIG. 16B

| CLOCKWISE (1) |
|---|
| START POINT NO. (0) |
| END POINT NO. (4) |
| OUTLINE MAX & MIN COORDINATES |
| CLOCKWISE (1) |
| START POINT NO. (−1) |
| END POINT NO. (−1) |
| OUTLINE MAX & MIN COORDINATES |
| CLOCKWISE (1) |
| START POINT NO. (−1) |
| END POINT NO. (−1) |
| OUTLINE MAX & MIN COORDINATES |
| CLOCKWISE (1) |
| START POINT NO. (−1) |
| END POINT NO. (−1) |
| OUTLINE MAX & MIN COORDINATES |
| CLOCKWISE (1) |
| START POINT NO. (a) |
| END POINT NO. (b) |
| OUTLINE MAX & MIN COORDINATES |
| CLOCKWISE (1) |
| START POINT NO. (c) |
| END POINT NO. (d) |
| OUTLINE MAX & MIN COORDINATES |
| CLOCKWISE (1) |
| START POINT NO. (e) |
| END POINT NO. (f) |
| OUTLINE MAX & MIN COORDINATES |
| CLOCKWISE (1) |
| START POINT NO. (g) |
| END POINT NO. (h) |
| OUTLINE MAX & MIN COORDINATES |
| CLOCKWISE (2) |
| START POINT NO. (i) |
| END POINT NO. (j) |
| OUTLINE MAX & MIN COORDINATES |

FIG. 16A

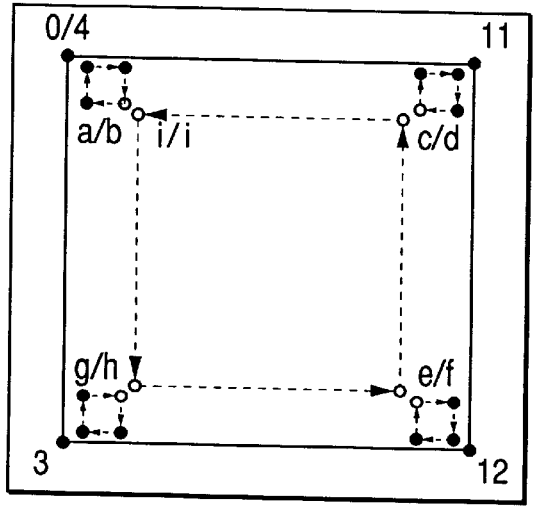

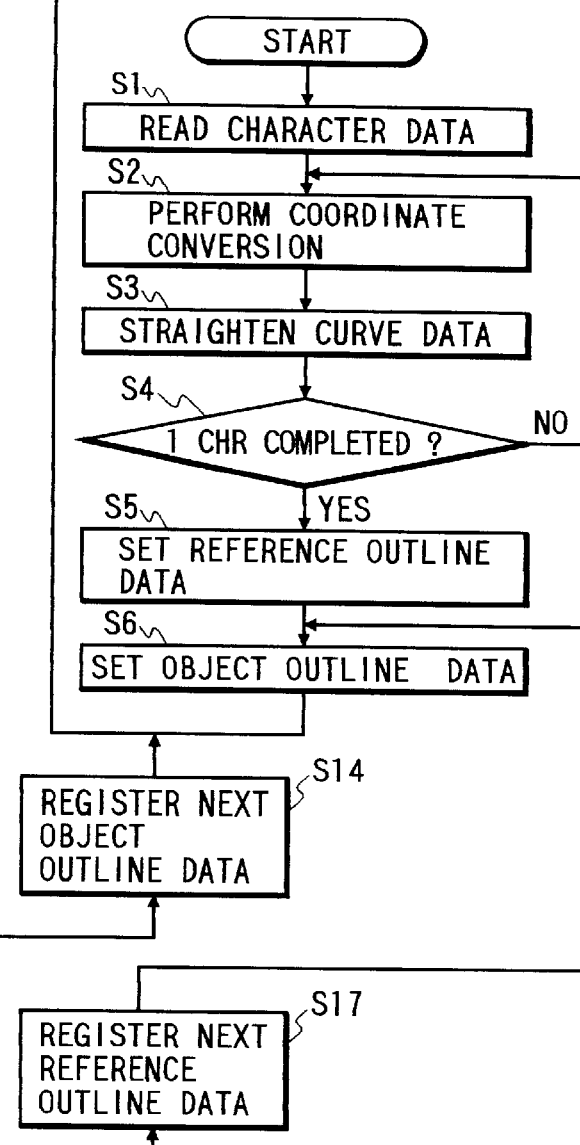
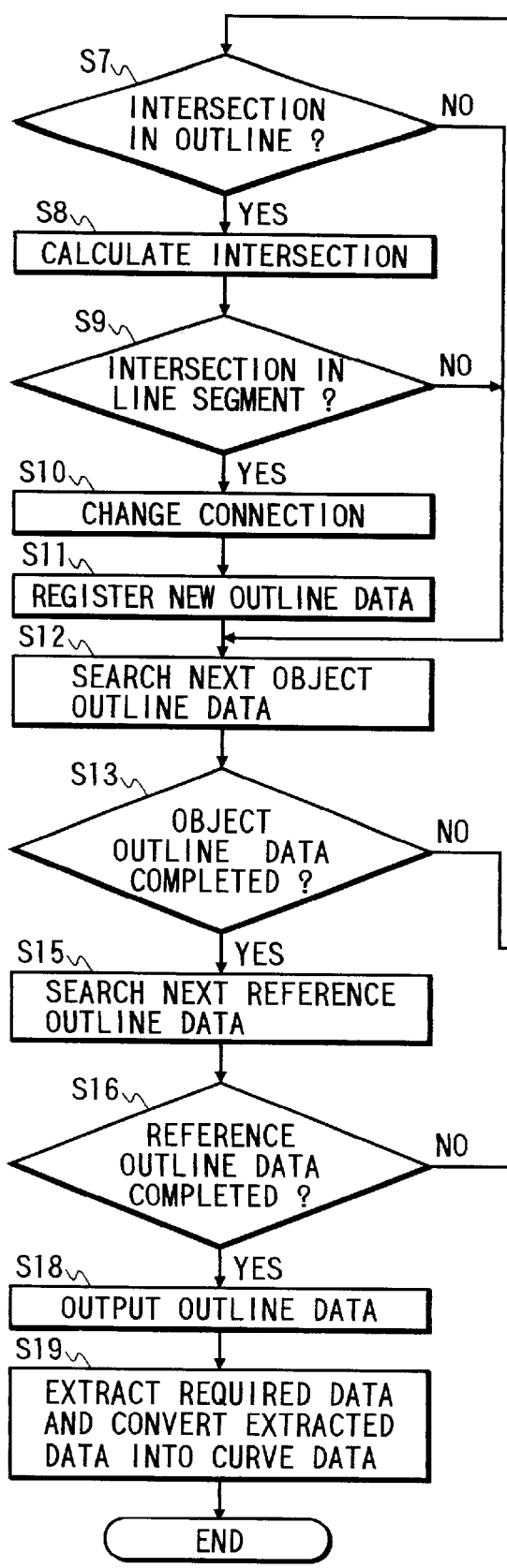
FIG. 22

| COORDINATE | FLAG |
|---|---|
| (X1,Y1) | 0 |
| (X2,Y2) | 1 |
| (X3,Y3) | 1 |
| (X4,Y4) | 0 |
| (X5,Y5) | 1 |
| (X6,Y6) | 1 |
| (X7,Y7) | 0 |
| (X8,Y8) | 0 |
| (X9,Y9) | 0 |
| (X10,Y10) | 0 |
| (X11,Y11) | 1 |
| (X12,Y12) | 1 |
| (X13,Y13) | 0 |
| (X14,Y14) | 1 |
| (X15,Y15) | 1 |

CHARACTER PROCESSING APPARATUS AND METHOD THEREFOR

BACKGROUND OF THE INVENTION

1. Field of the Invention

The present invention relates to a character processing apparatus and a method therefor, for providing a character pattern of high quality by converting intersecting stroke data into non-intersecting outline data.

2. Related Background Art

In case of generating a large-sized character or an outlined character from a character of intersecting strokes, the data of intersecting strokes have to be converted into data of the non-intersecting entire outline before the generation process. For this purpose there has been employed a process of generating bit map data from the stroke data and tracing the outline of such bit map data thereby obtaining the coordinate data of the entire outline.

In order to improve the quality of the large-sized character or the outlined character, the outline has to be traced after the bit map is generated in the desired output size, so that there is involved a long processing time.

The generation of the bit map is sometimes limited to a certain size because of the limitation in the capacity of the bit map developing memory. In such case, for obtaining a character of a larger size, there is inevitably required an expansion of the coordinate values obtained from the generated outline, so that the deterioration of the image quality is inevitable depending on the memory capacity.

On the other hand, for achieving high-speed processing, there has been employed a method of forming a bit map image of a small size, tracing the outline of such bit map image to obtain the coordinates of the entire outline and expanding or reducing the obtained coordinates. In such case significant deterioration in quality is unavoidable in the large-sized output character.

SUMMARY OF THE INVENTION

The object of the present invention is to resolve the above-mentioned drawbacks and to provide an information processing apparatus and a method therefor, capable of generating data of the entire non-intersecting outline from the intersecting stroke data at a higher speed, thereby outputting a character or a pattern of higher quality.

The above-mentioned object can be attained, according to the present invention, by an information processing apparatus for generating a non-intersecting outline from data registered in each of the strokes that may mutually intersect, comprising extraction means for extracting every pair from all the registered strokes of a character, intersection discrimination means for discriminating whether the segments of the strokes of each stroke pair, extracted by the extraction means, mutually intersect, intersection coordinate calculation means for calculating the coordinate of the intersection of the segments in case an affirmative result is obtained by the intersection discrimination means, intersection coordinate storage means for storing the coordinate of the intersection calculated by the intersection coordinate calculation means, and re-connection means for re-connecting the outline according to a predetermined rule and based on the intersection coordinate stored in the intersection coordinate storage means.

According to the present invention, there is also provided an image processing apparatus for generating non-intersection outline data from outline data registered in each of the strokes that may mutually intersect, comprising:

reading means for reading the outline coordinates of two strokes;

straightening means for straightening the outline represented by the outline coordinates;

discrimination means for discriminating whether the outlines of the two strokes mutually intersect, based on the outline coordinates of the two strokes;

outline data generation means for determining an intersection in case the intersection is identified by the discrimination means and changing the connection of the outline points including such intersection thereby generating non-intersecting outline data;

judgment means for judging a curve portion in the non-intersecting outline data generated by the outline data generation means; and curve generation means for generating a curve based on the curve portion judged by the judgment means.

BRIEF DESCRIPTION OF THE DRAWINGS

FIG. 4 is a flow chart showing an example of the control program stored in a ROM 2 shown in FIG. 1;

FIGS. 13A, 13B, 13C and 13D are views showing re-connection of two strokes;

FIGS. 14A, 14B and 14C are views showing the state of two strokes after re-connection;

FIGS. 16A and 16B are views showing the state after re-connection of strokes;

FIG. 22 is a flow chart showing an outline data generation process in an information processing system constituting an embodiment 3 of the present invention;

DESCRIPTION OF THE PREFERRED EMBODIMENTS

[First Embodiment]

Figure 1:
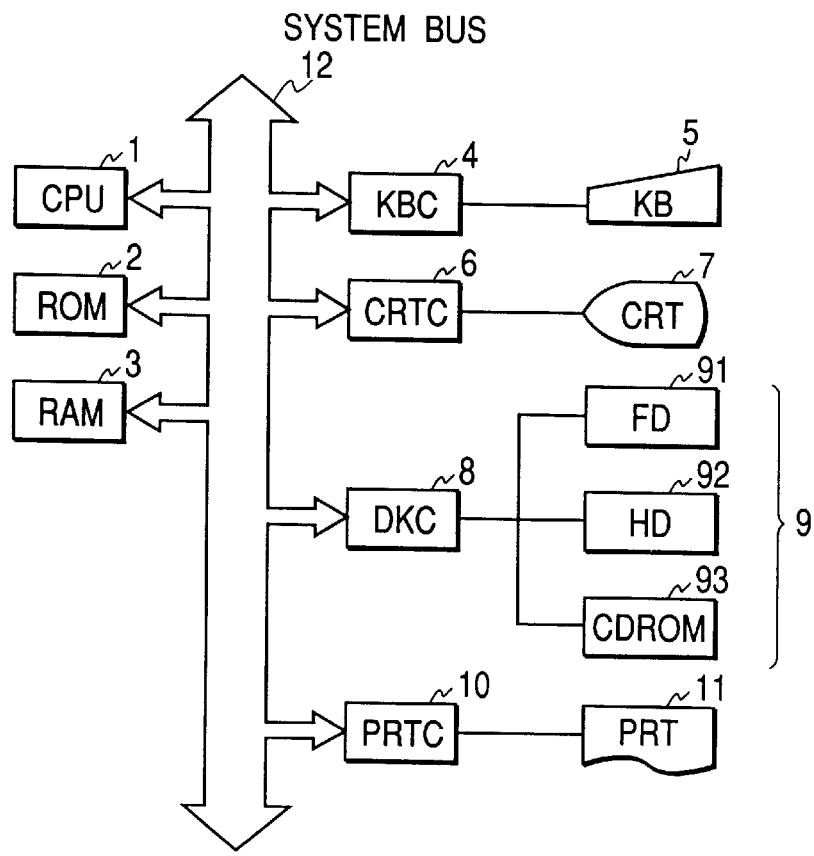
FIG. 1 is a block diagram of an embodiment of the present invention.

FIG. 1 illustrates the configuration of a first embodiment of the present invention. The present embodiment can be a system composed of plural equipment or an apparatus consisting of a single equipment. The system of the present embodiment can also be a word processor, a work station or a personal computer.

Referring to FIG. 1, a CPU (central processing unit) 1 executes control of the entire apparatus and various operations. When necessary, the CPU 1 refers to data stored in an external memory 9 and stores such data in a RAM 3. There are also provided a ROM (read-only memory) 2 storing a program for activating the system, character patterns and data for character conversion; a RAM (random access memory) 3 for temporarily storing data used in the operations of the CPU 1 and results of operations thereof; a keyboard control unit (KBC) 4 for transferring key input data (character codes and control codes) received from a keyboard (KB) 5 to the CPU 1; a CRT (cathode ray tube) display unit 7 for displaying a bit map image; a display controller (CRTC) 6 for reading a bit map image converted from a character code and transferring the same to the CRT display 7; an external memory 9 storing programs and data and preferably composed of a floppy disk (FD) 91, a hard disk (HD) 92, a CD-ROM 93 etc., wherein the hard disk stores an operating system; a disk controller (DKC) 8 for controlling the data transfer of the external memory 9; a printer controller (PRTC) 10 for driving a printer (PRT) 11 which is preferably composed of a laser beam printer, a thermal jet printer or a thermal transfer printer; and a system bus 12 for effecting data exchange among the CPU 1, ROM 2, RAM 3, keyboard controller 4, display controller 6, disk controller 8 and printer controller 10.

The programs and associated data are supplied from the floppy disk 91 or the CD-ROM 93 and installed once in the hard disk 92, from which they are loaded in the RAM 3 for execution. Otherwise they may be directly loaded from the floppy disk 91 or the CD-ROM 93 into the RAM 3, without installation in the hard disk 92, for execution.

When the power supply is turned on, the present system is activated by reading the operating system from the hard disk 92 into the RAM 3, by an IPL (initial program loading) function in the basic I/O program stored in the ROM 2. The present system functions by the execution of the basic I/O program, the operating system 211 such as a window system, and an application 212.

Figure 2:
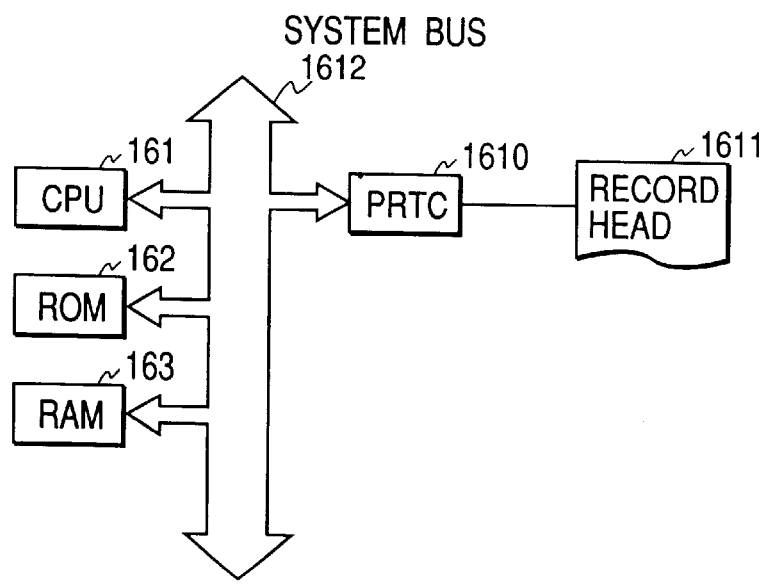
FIG. 2 is a block diagram showing the configuration of a printer 11 shown in FIG. 1.

FIG. 2 shows the configuration of the printer 11 shown in FIG. 1. Referring to FIG. 2, there are provided a CPU 161 for controlling the entire apparatus and executing various operations; a ROM 162 for storing a system activation program, character patterns and data; a RAM 163 constituting a data memory area without limitation in use, used for loading a program and data in each process; and a printer controller (PRTC) 1610 for controlling a recording head 1611. The above-mentioned components 161 to 163, 1610 to 1611 are mutually connected through a system bus 1612.

Figure 3:
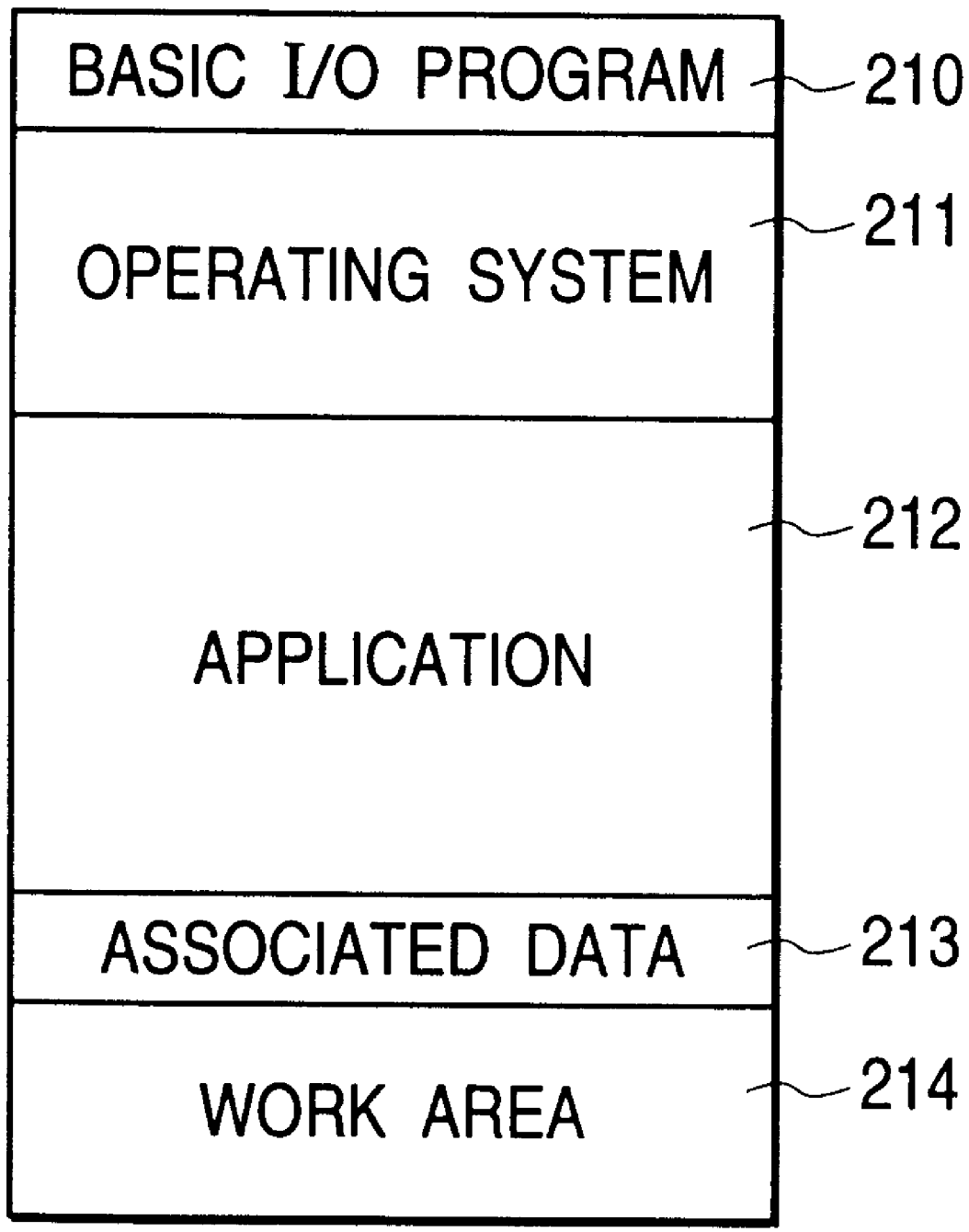
FIG. 3 is a view showing the memory map of a RAM 3 shown in FIG. 1.

FIG. 3 is a view showing an example of the memory map in the RAM 3 shown in FIG. 1. An area 210 is used for loading the basic I/O program, an area 211 for loading the operating system such as the window system, an area 212 for the application, and an area 213 for the associated data. An area 214 is used as a work area for loading the programs.

FIG. 4 is a flow chart showing an example of the control program stored in the ROM 2 shown in FIG. 1. Character codes, an output size, a font, deformation information etc. are transferred as the interface of the program.

Figure 5:
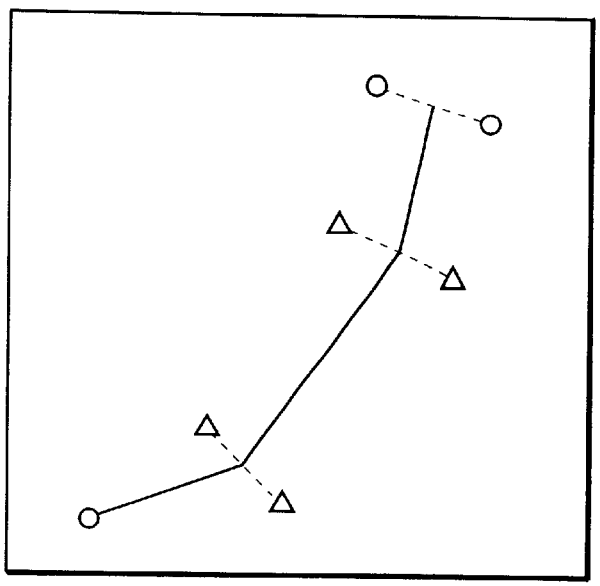
FIG. 5 is a view showing an example of stroke data represented by a core line and widths.
Figure 6:
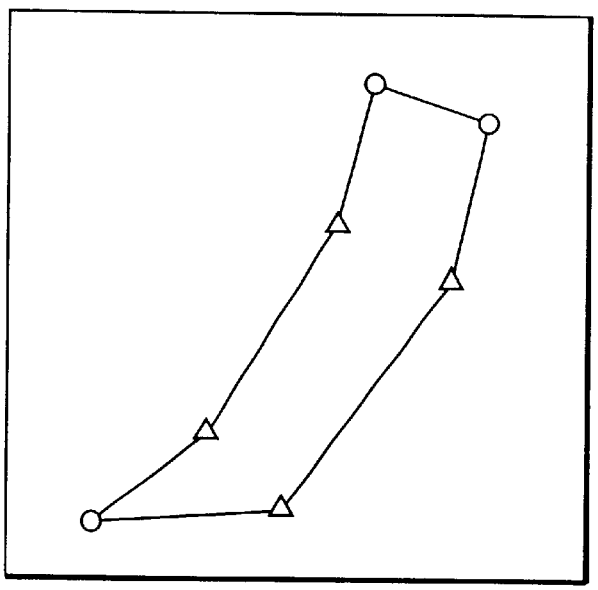
FIG. 6 is a view showing an example of outline data in stroke units.

A step S201 reads data of an object character, based on a character code and a font. The data thus read are character data registered in stroke units. Each stroke may be represented by data composed of a core line and widths as shown in FIG. 5, or outline data as shown in FIG. 6. In the former case, the data represented by a core line and width are converted into outline coordinates of each stroke.

A step S202 executes coordinate conversion such as enlargement/reduction or deformation, based on the width and the height of the character, represented by the data stored in advance in the external memory 9 such as the hard disk 92, or in the ROM 2, and on the output size requested by the interface. Then a step S203 generates short vector data if curve data are present. The curve data are defined in advance for example by a third-order Bezier function, a third-order B-Spline function, a second-order Bezier function and a second-order B-spline function. In the following there will be explained a case of forming short vectors cut of a curve defined by a third-order Bezier function as shown in FIG. 7.

Figure 7:
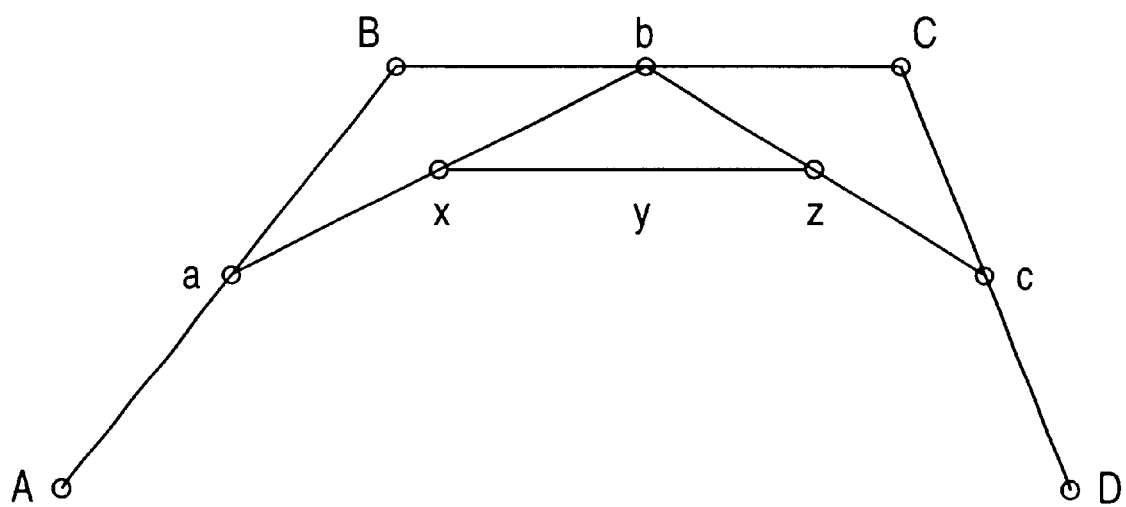
FIG. 7 is a view showing the principle of Bezier decomposition.
Figures 8A, 8B, 8C:
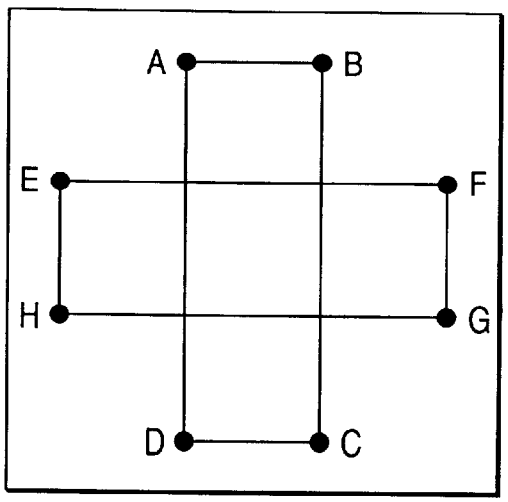
FIGS. 8A, 8B and 8C are views showing an example of the structure of stroke data prior to entire outline conversion.

By decomposing original points A, B, C, D defined by the third-order Bezier function as shown in FIG. 7, there are formed middle points a of a segment AB, b of a segment BC, c of a segment CD, x of a segment ab, z of a segment bc and y of a segment xz, whereby generated two new sets Aaxy, yzcD of Bezier points. Decomposition is continued on such new Bezier point sets Aaxy, yzcD, until a predetermined converging condition is satisfied. The newly obtained points constitute the points of short vectors. Then there are registered the set of points representing the short vectors obtained from thus determined Bezier curve and the set of points originally registered as straight lines segments are so registered as to maintain the original sequence of the outline. FIG. 8A shows the mode of the set of thus registered coordinates. The content of registration contains, at first, an outline data management information portion (FIG. 8B) indicating the information of an outline and including the direction of rotation (clockwise or counterclockwise) of each outline, the number of a starting point, the number of an end point and the maximum and minimum coordinates of the outline data, and, then, an outline coordinate data portion actually storing the outline coordinates. At the number of the start and end points represented in the outline data management information portion, there are stored the coordinates of the outline, the number of an immediately preceding point and that of an immediately following point. FIG. 8C shows an outline coordinate data table.

Then a step S204 discriminates whether the outline data of all the strokes of a character have been generated. If a stroke to be processed still remains and the data generation has not been completed, the sequence returns to the step S202. On the other hand, if the coordinate conversion and the straightening of the curve data have been completed for all the strokes of a character, the sequence proceeds to a step S205 to check the outline data registered up to the step S204 and, if an intersection of outlines is found, to reconnect such outlines to generate new outlines.

More specifically, in the step S205, the initially registered outline data are taken as reference outline data as shown in FIG. 8A. A next step S206 sets the data of an outline, next to the reference outline of which data are set in the step S205, as the data of an object outline. Then a step S207 checks, based on the reference outline data and the object outline data, whether the line segments mutually intersect. More specifically, based on the information of the outlines shown in FIG. 8A, two line segments having a smaller maximum coordinate and a larger minimum coordinate between the larger maximum coordinate and the smaller minimum coordinate in the reference outline data and the object outline data are regarded as mutually intersecting.

Figure 9:
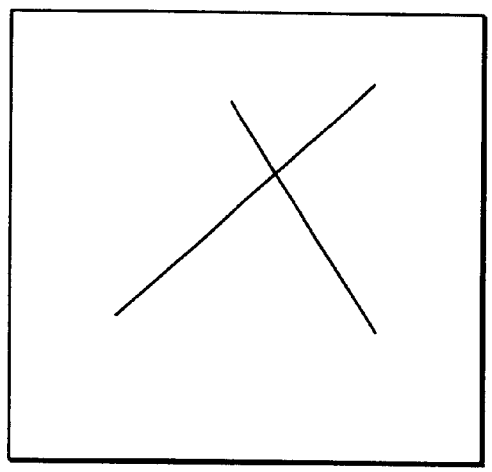
FIG. 9 is a view showing an example of intersecting line segments.
Figure 10:
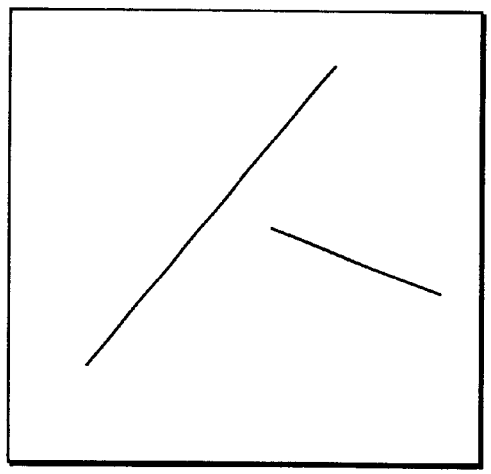
FIG. 10 is a view showing an example of non-intersecting line segments.

Then a step S208 calculates the intersecting point from the data of the line segments regarded as mutually intersecting, and a step S209 judges that an intersection is present in case the obtained intersection is present between the smaller maximum coordinate and the larger minimum coordinate. If the intersection is contained simultaneously in the two line segments as shown in FIG. 9, the intersection is finally discriminated as present, but, if the intersection is present outside the two line segments as shown in FIG. 10, the intersection is discriminates as absent. The mutually intersecting line segments are checked in all the combinations of the line segments of the reference outline data and those of the object outline data, then there are checked whether the intersections are present on all the line segments of the reference outline data and those of the object outline data, and, if the coordinate is calculated for any present intersection.

In case the step S209 identifies at least an intersection, a step S210 executes a re-connection process. More specifically, in case two line segments mutually intersect, the two outline data are re-connected by adding the intersection determined in the step S208.

Figures 12A, 12B, 12C:
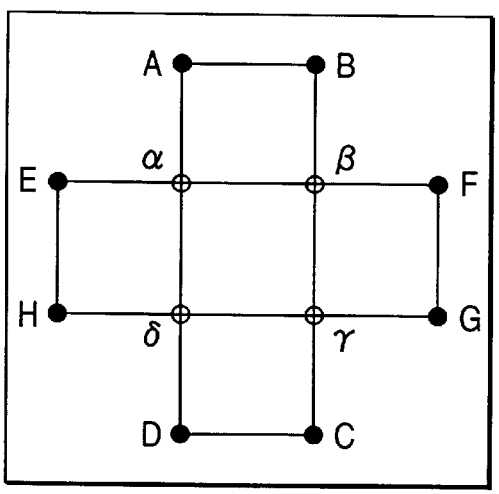
FIGS. 12A, 12B and 12C are views showing data structure after the determination of intersection.

The mode of such re-connection is shown in FIGS. 12A to 12C and FIGS. 13A to 13D. In the example shown in FIG. 12A, the intersection of the line segment DA of the reference outline data and the line segment EF of the object outline data is taken as $\alpha$, that between the line segments BC and EF is taken as $\beta$, that between the line segments BC and GH is taken as $\gamma$, and that between the line segments DA and GH is taken as $\delta$. These intersections are stored in the outline coordinate data table (FIG. 12C) in the sets of two each, because, for example in case of re-connecting line segments AB and CD having an intersection Z, new sets of coordinate are required such as A→Z→D and C→Z→B. Also since only a start point and an end point is required for an outline after the re-connection of the outline data, the object outline data are re-connected in a loop form, as shown in FIG. 12C, by deleting the end point at No. 9 in the outline coordinate data table and connecting it to the start point. In practice the two outlines are re-connected as shown in FIGS. 13A to 13D.

In the following there will be given a more detailed explanation in FIG. 13A. As the line segment DA of the reference outline data intersects with the line segment EF of the object outline data at the intersection $\alpha$, a connection D→$\alpha$1→F by connecting the start point D of the line segment of the reference outline data with the end point F of the line segment of the object outline data through the intersection $\alpha$1. Also another connection E→$\alpha$2→A by connecting the start point E of the line segment of the object outline data with the end point A of the line segment of the reference outline data through the intersection $\alpha$2. Also the number of a next point and that of a preceding point are changed according to such re-connection. In the following there will be explained, with reference to FIG. 13B, the re-connection of the line segment BD of the reference outline data and that EF of the object outline data shown in FIG. 12. Since the line segment EF is already divided into line segments E $\alpha$2 and $\alpha$1F, the line segment $\alpha$1F, containing the intersection, is selected as the line segment of the object outline data. Then the line segments BC, $\alpha$1F and the intersection $\beta$ are re-connected as B→$\beta$1→F and $\alpha$1→$\beta$2→C. Then the number of the next point and that of the preceding point are changed according to such re-connection.

In the following there will be explained, with reference to FIG. 13C, the re-connection of the line segment BC of the reference outline data and that GH of the object outline data. The line segment $\beta$2C of the reference outline data and that GH of the object outline data having the intersection $\gamma$ are re-connected as $\beta$2→$\gamma$1→H and G→$\gamma$2→C. Also the outline coordinate data table is modified according to such re-connections. Finally there will be explained, with reference to FIG. 13D, the re-connection of the line segment DA of the reference outline data and that GH of the object outline data. The line segment D$\alpha$1 of the reference outline data and that $\gamma$1H of the object outline data are re-connected as D→$\delta$1→H and $\gamma$1→$\delta$2→$\alpha$1, and the outline coordinate data table is modified according to such re-connections. FIG. 13D shows the outline coordinate data table after the re-connecting operation in the step S210.

Then a step S211 executes deletion of the registration of the outline that has vanished by the re-connection in the step S210 or addition of the registration of the outline that has newly generated. As the step S210 has generated a connection A→B→$\beta$1 →F→G→$\gamma$2→C→D→$\delta$1→H→E→$\alpha$2→A (cf. FIG. 14A), the object outline data E→F→G→H are absorbed in the reference outline data. Consequently, for indicating that the reference outline data have vanished, the start point number and the end point number are changed to (−1) as shown in FIG. 14B. Also there has been generated a new outline $\alpha$1→$\beta$2→$\gamma$1 →$\delta$2 (cf. FIG. 14A), not belonging to the above-mentioned outline, has been generated. Since the state shown in FIG. 13D is a loop without the start point or the end point, the new outline is registered by selecting one of the points as the start point and adding an end point. The registration is made at the end of the outline data management information portion. Then the rotating direction and the maximum and minimum coordinates of this outline are checked and registered as shown in FIGS. 14A and 14C. The steps S207 to S211 are to change the connections of the reference outline data and the object outline data, and the process for the data of an object outline is thus completed.

Then a step S212 searches a next candidate of the object outline data, for example by checking if other outline data are present after the object outline data processed in the step S211. Then a step S213 discriminates whether the object outline data have been exhausted, and, if not, a step S214 registers the object outline data searched in the step S212 as the outline data to be newly checked, and the sequence then returns to the step S207. On the other hand, if the object outline data no longer exist, namely if the process has been completed for a set of reference data, the sequence proceeds to a step S215. The step S215 searches new reference outline data, by checking if next data are present after the reference outline data processed up to the step S214.

Then a step S216 discriminates whether the reference outline data have been exhausted, and, if not, a step S217 regsters the reference outline data searched in the step S215 as the reference data to be newly checked, and the sequence then returns to the step S206. On the other hand, if the reference outline data no longer exist, the sequence proceeds to a step S218. (In the search for the object or reference outline data in the step S212 or S215, such data are judged as present if the start and end point values are not (−1). In case these values are (−1), the outline data are identified as having vanished and the search is continued for the next outline data. A step S218 output the outline data, determined up to the step S216, as the entire outline data not involving intersection. Such non-intersecting entire outline data do not necessarily include all the outlines registered in the outline data management information portion. In the example shown in FIG. 14A, the outline A→B→β1→F→G→γ2→C→D→δ1→H→E→α2→A is an outline to be finally registered, but the outline α1→β2→γ1→δ2 is not to be finally registered. The distinction of such outlines is executed in the following manner.

The number of the outlines initially registered in the outline data information portion is memorized, and, among the outline data finally registered in positions not exceeding such number, those not showing inversion of the rotating direction (A→B→β1→F→G→γ2→C→D→δ1→H→E→α2→in the example shown in FIG. 14A) are judged as the data to be registered. Among those registered in positions exceeding the above-mentioned number, namely among those newly registered, those showing inversion of the rotating direction alone are judged as the data to be registered. In the example shown in FIG. 14A, no data correspond to such definition.

Figures 15A, 15B:
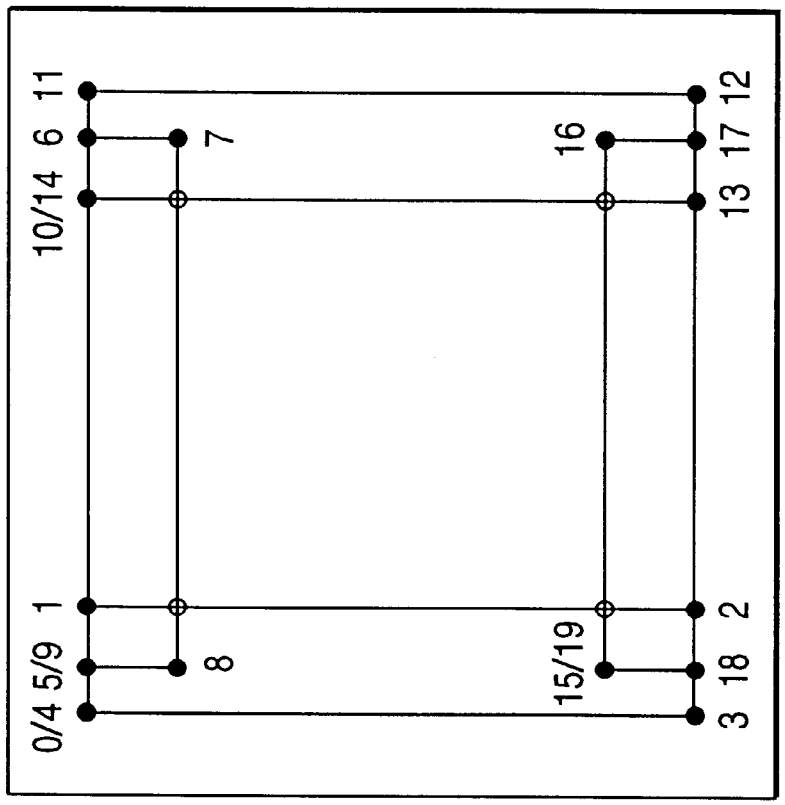
FIGS. 15A and 15B are views showing data after stroke conversion.
Figure 17:
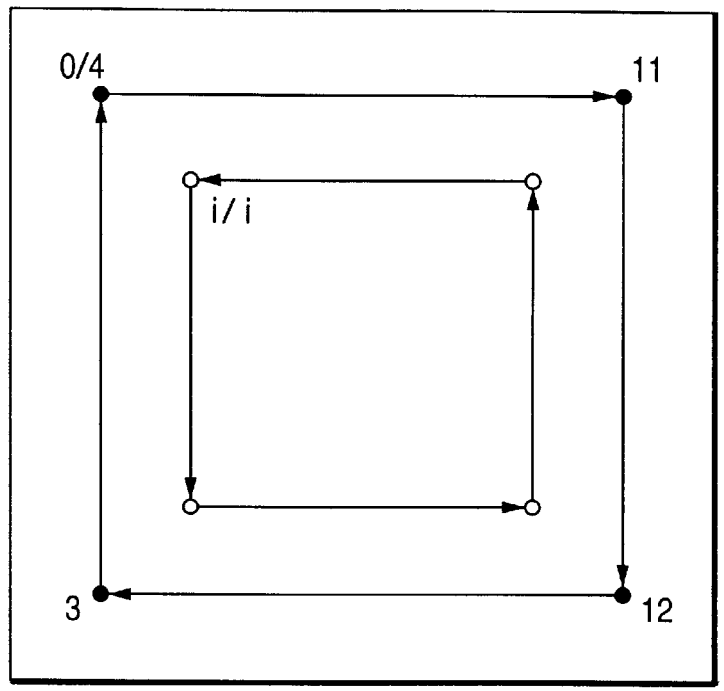
FIG. 17 is a view showing the state after stroke conversion.

In the following there will be explained an example of the outline data group as shown in FIGS. 15A and 15B. In this example, the initial number of the outlines is 4. The processing of these outline data according to the above-explained algorithm finally provides data shown in FIGS. 16A and 16B. In this case, since the number of the initial outlines is 4, the condition of being registered in a position not exceeding the initial number and not showing the inversion of the rotating direction is met only by the initial outline. Also the condition of being registered in a position exceeding the initial number and showing the inversion of the rotating direction is only by the final outline. Consequently these two outlines only are finally registered, and there can be generated the non-intersecting entire outline data, as shown in FIG. 17.

It is therefore rendered possible to generate the non-intersecting outline data from the intersection-involving outline data, by detecting the intersection of the outlines, re-connecting the mutually intersecting outlines and finally extracting the necessary data.

On the other hand, if the step S207 identifies that the reference outline data and the object outline data do not mutually intersect, the sequence proceeds to the step S212.

Figure 11:
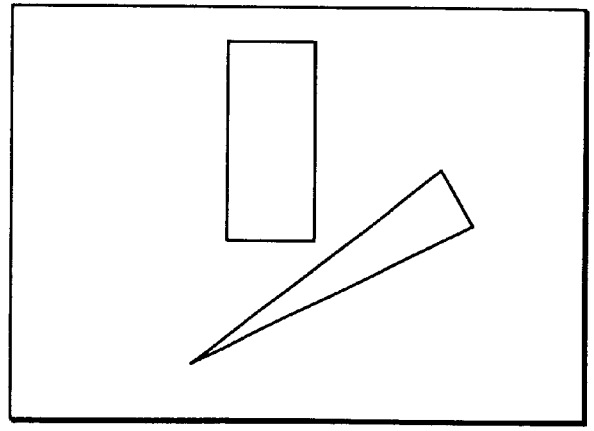
FIG. 11 is a view showing an example of non-intersecting strokes.

Also if the step S209 identifies that the reference outline data and the object outline data do not have intersection therebetween, the sequence proceeds to the step S212. More specifically, in case the step S207 judges that the intersection is present but the actual checking of the line segments in the step S208 identifies the absence of such intersection (as in the case shown in FIG. 11), the sequence proceeds to the step S212.

[Second Embodiment]

A second embodiment of the present invention executes elimination of the intersection of the intersecting strokes according to the instruction of the user, on a font editer image frame or a graphic editing image frame definable by the user.

Figure 18:
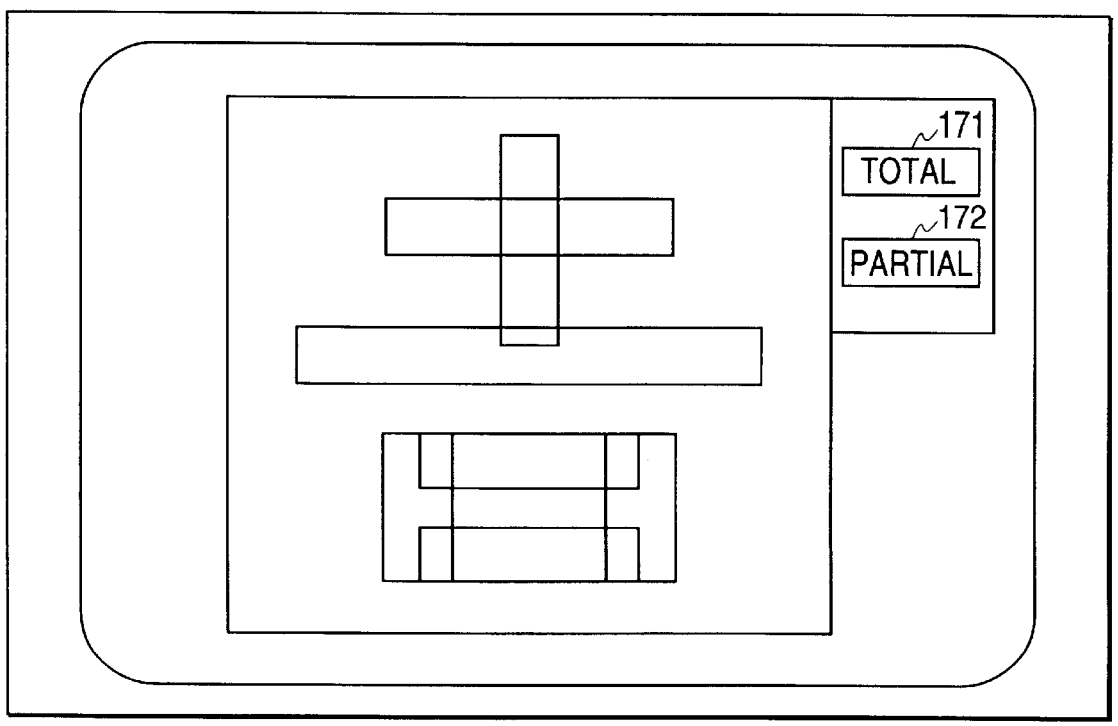
FIG. 18 is a view showing the state of editing characters or graphics on a computer image frame.

FIG. 18 illustrates a character-graphic editing dialogue displayed on the CRT display unit 7 shown in FIG. 1. When a collective conversion 171 on this dialogue is selected by the user, there is set a collective conversion mode for effecting conversion from the intersection-involving outline data into the non-intersecting outline data, for all the data displayed on the editing image frame. Also in case a partial conversion 172 on this dialogue is selected by the user, there is set a partial conversion mode in which a conversion object area is designated by the user and the conversion from the intersection-involving outline data into the non-intersecting outline data is executed only for the strokes relating to such area.

Figure 19:
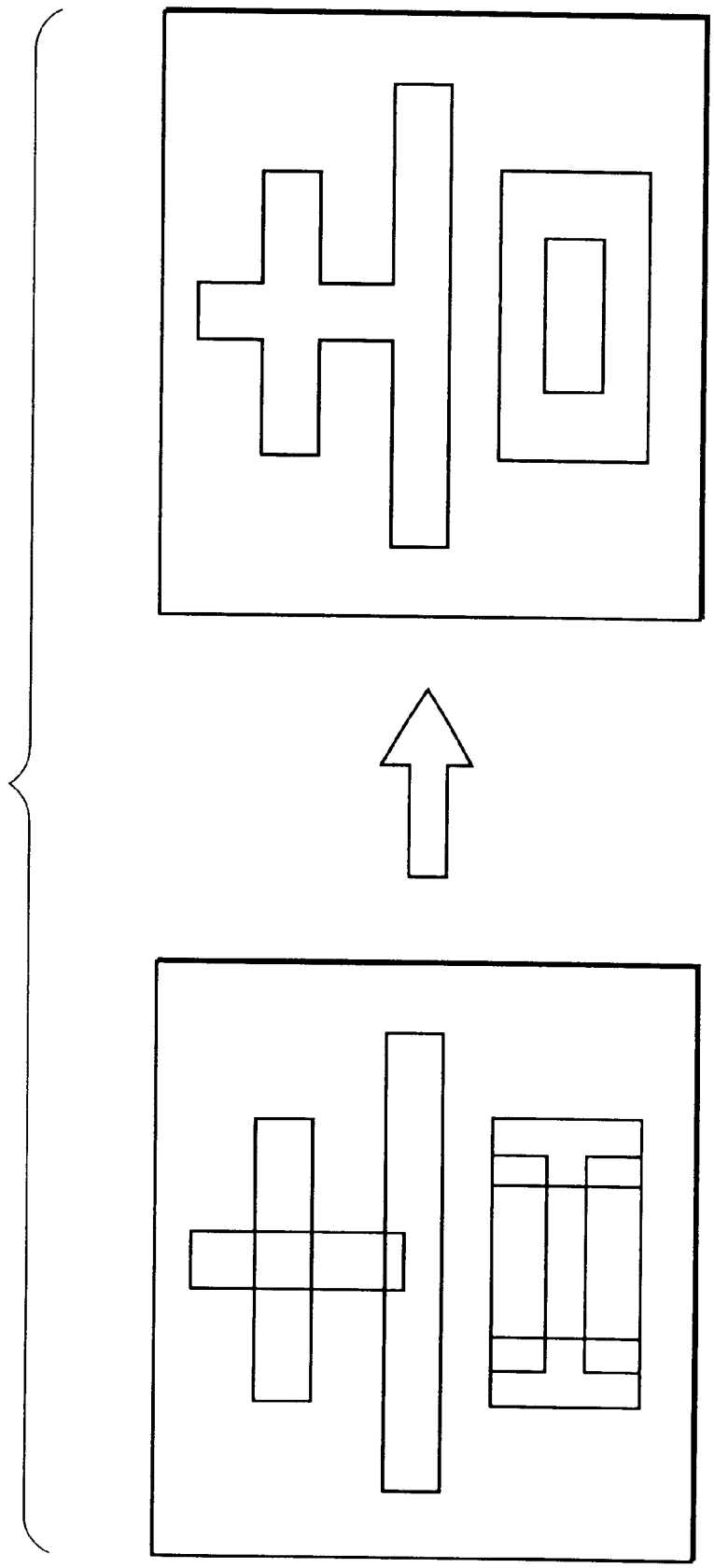
FIG. 19 is a view showing the process after an entire editing areas is designated.

If the user selects the collective conversion 171 for a character "吉" (pronounced as "kichi" and meaning "lucky"), the conversion is collectively made for all the strokes or for the graphics on the editing image frame, in a mode shown in FIG. 19. In this operation, as explained in the first embodiment, the intersections are checked for all the editing data, and, if any intersection is present, conversion is made to non-intersecting outline data.

Figure 20:
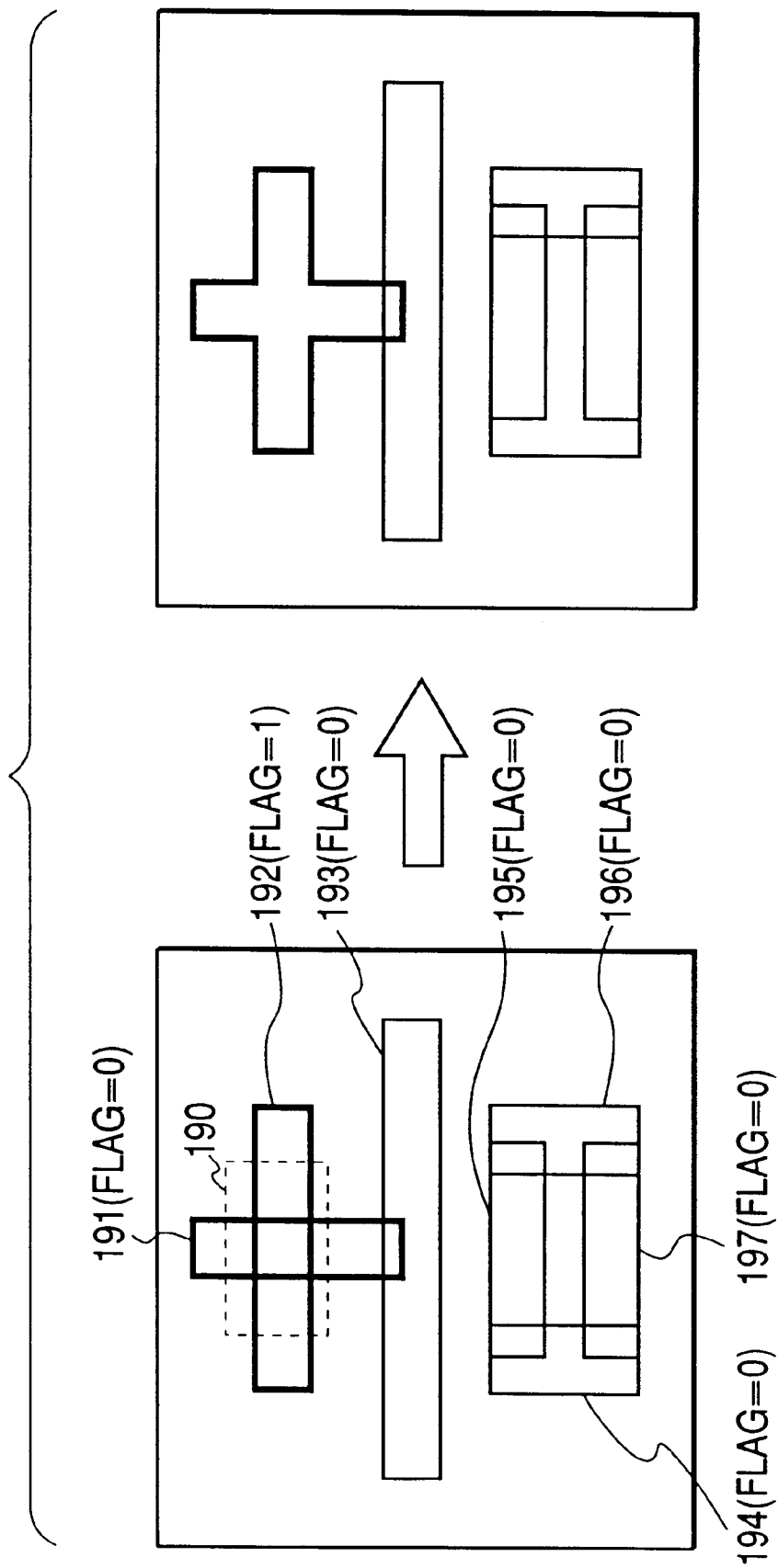
FIGS. 20 and 21 are views showing the process after a partial area is designated.

In case of partial conversion for the character "吉" shown in FIG. 18, the user selects the partial conversion 172 of the character-graphic editing dialogue and designates a partial area. As an example, as shown in the left-hand side of FIG. 20, a partial area 190 is surrounded by a broken-lined frame, and, by a click of the mouse, there is checked whether any stroke relating to the partial area 190 is present. If present, such relating strokes are identified. In the example shown in FIG. 20, strokes 191, 192 are identified to be related to the partial area 190, but other strokes 193 to 197 are identified to be unrelated. A flag indicating such relation is set on each of such relating strokes, and such flag is cleared for each of such unrelated strokes. Then the strokes with such set flags are extracted and such strokes alone are subjected to the process explained in the first embodiment. Thus, for a character including displayed intersection-involving strokes, there is executed a process of generating non-intersecting outlines in a part of the editing area, and, if an area for generating the non-intersecting outlines is defined, strokes relating to such area are extracted and there is discriminated whether the line segments of every pair of thus extracted strokes mutually intersect. If the intersection is identified to be present, the coordinate of the intersection is calculated and stored, and the outlines are re-connected according to a predetermined rule, based on thus stored coordinate of intersection. In this manner there is achieved the conversion from the intersection-involving outline data to those not involving intersection for the strokes relating to the partial area.

Figure 21:
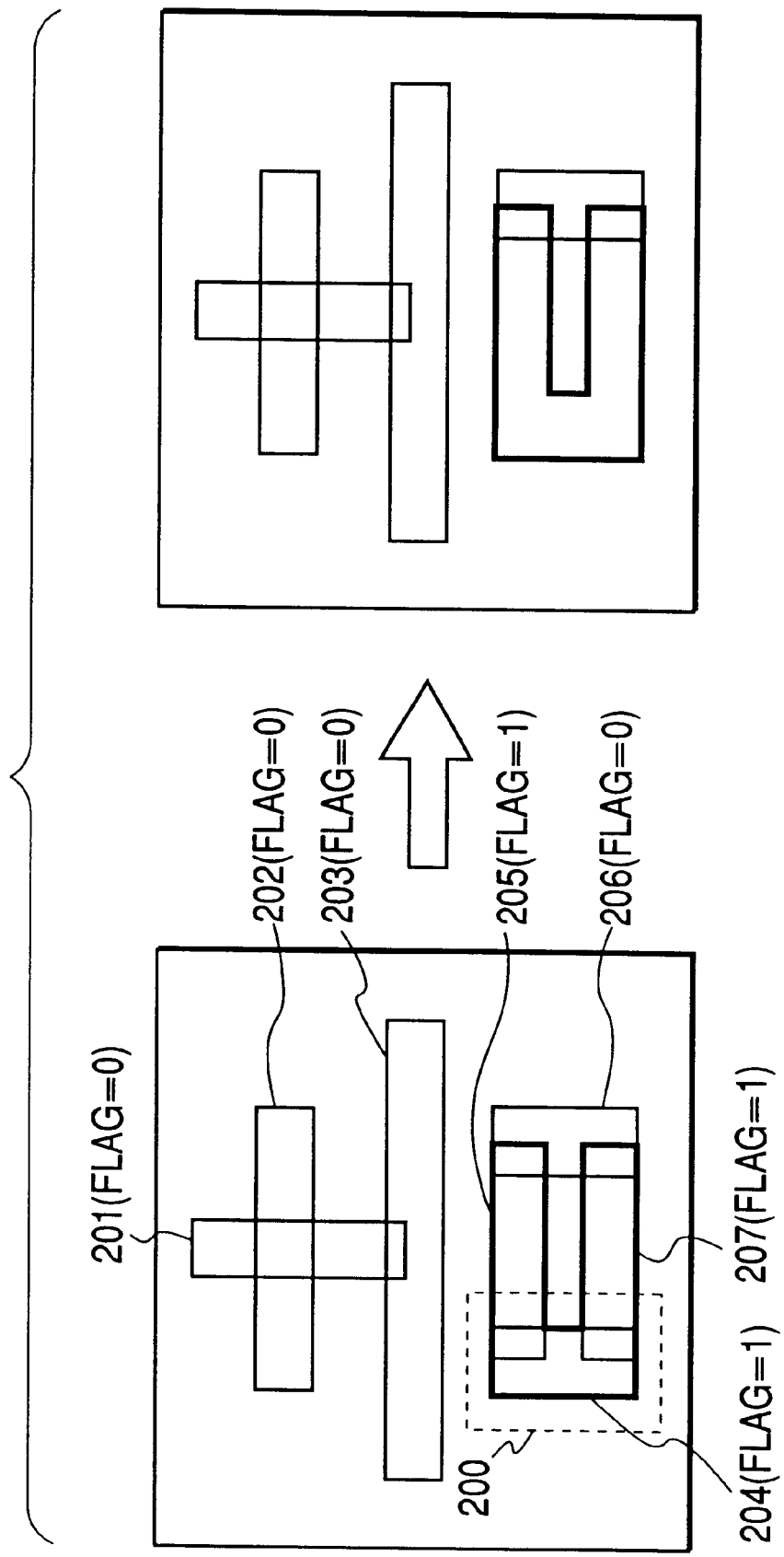

As an example, as shown in the left-hand side of FIG. 21, a partial area 200 is surrounded by a broken-lined frame, and, by a click of the mouse, there is checked whether any stroke relating to the partial area 200 is present. If present, such relating strokes are identified. In the example shown in FIG. 21, strokes 204, 205, 207 are identified to be related to the partial area 190, but other strokes 201 to 203, 206 are identified to be unrelated. A flag indicating such relation is set on each of such strokes relating to the partial area 200, and such flag is cleared for each of such unrelated strokes. Then the strokes with such set flags are extracted and such strokes alone are processed in a similar manner as explained in relation to FIG. 20. In this manner there is achieved the conversion from the intersection-involving outline data to those not involving intersection for the strokes relating to the partial area.

In case the user generates an intersection of the strokes in the course of editing operation for characters or graphics, it is thus rendered possible, by an instruction to eliminate such intersections, to automatically eliminate such intersection of two or more outlines without the tedious work by the user.

As explained in the foregoing, the present embodiment allows to generate the outline coordinates of the non-intersecting entire outlines, from the coordinate data of the intersection-involving strokes, with high image quality and with a high speed.

[Third Embodiment]

FIG. 22 is a flow chart showing the process executed in a third embodiment of the present invention. A program corresponding to this process is stored as an application program 212.

At first a step S1 receives a character code, the output size, font and deformation information thereof, and obtains object character data based on such character code and font. The data thus read are character data registered in stroke units. Each stroke may be represented by data composed of a core line and widths as shown in FIG. 5, or outline data as shown in FIG. 6. In the former case, the data represented by a core line and width are converted into outline coordinates of each stroke. FIGS. 5 and 6 indicate strokes corresponding to a same outline, wherein o indicates an end point and Δ indicates an intermediate point.

A step S2 executes coordinate conversion such as enlargement/reduction or deformation, based on the width and the height of the character, represented by the data stored in advance in the external memory 9 such as the hard disk 92, or in the ROM 2, and on the output size requested by the interface in advance prior to the start of the present process.

Then a step S3 generates short vector data if curve data are present. The curve data are defined in advance for example by a third-order Bezier function, a third-order B-Spline function, a second-order Bezier function or a second-order B-Spline function. In the present case, original points A, B, C, D defined by the third-order Bezier function as shown in FIG. 7 are decomposed to form middle points a of a segment AB, b of a segment BC, c of a segment CD, x of a segment ab, z of a segment bc and y of a segment xz, thereby generating two new sets Aaxy, yzcD of Bezier points. Decomposition is continued on such new Bezier point sets Aaxy, yzcD, until a predetermined converging condition is satisfied. The newly obtained points constitute the points of short vectors. Then there are registered the set of points representing the short vectors obtained from thus determined Bezier curve and the set of points originally registered as straight lines segments are so registered as to maintain the original sequence of the outline.

FIGS. 8A to 8C show the mode of the set of thus registered coordinates.

FIG. 8A shows an example of the outlines, while FIG. 8B shows the data configuration of the outline data management information portion including, for each outline, the direction of rotation (clockwise or counterclockwise) of each outline, and the numbers of the starting and end points, and FIG. 8C shows the data configuration of the outline coordinate data portion.

The content of registration contains, at first, the outline data management information portion (FIG. 8B) indicating the information of an outline and including the direction of rotation (clockwise or anticlockwise) of each outline, the number of a starting point (corresponding to the address of the outline coordinate data table), the number of an end point (corresponding to the address of the outline coordinate data table), and the maximum and minimum coordinates of the outline data, and, then, the outline coordinate data portion (FIG. 8C) actually storing the outline coordinates. At the number of the start and end points represented in the outline data management information portion, there are stored "the coordinates of the outline", "the number of an immediately preceding point" and "the number of an immediately following point".

Then a step S4 discriminates whether the outline data of all the strokes of a character have been generated. If the coordinate conversion and the straightening of the curve data have been completed for all the strokes of a character, the sequence proceeds to a step S5, but, if strokes to be processed still remain, the sequence returns to the step S2.

Starting from the step S5, there is executed a process for checking the outline data registered up to the step S4 and, if an intersection of outlines is found, re-connecting such outlines to generate new outlines. More specifically, in the step S5, the initially registered outline data are taken as reference outline data as shown in FIG. 8A.

A next step S6 sets the data of an outline, next to the reference outline of which data are set in the step S205, as the data of an object outline. Then a step S7 discriminates, based on the reference outline data and the object outline data, whether the line segments mutually intersect. The discrimination in this step is achieved, based on the information of the outlines shown in FIG. 8A, by checking the maximum and minimum coordinates of the reference outline data (outline ABCD) and those of the object outline data (outline EFGH) and judging whether they mutually overlap, namely whether the maximum or minimum value of the outline data is present between the maximum and minimum values of the other outline data. If present, the intersection is identified as present and the sequence proceeds to a step S8, but, if absent, the intersection is identified as absent and the sequence proceeds to a step S12 for searching next object outline data.

The step S8 searches the mutually intersecting line segments of the reference outline data (ABCD) and the object outline data (EFGH), and, for any intersection found, calculates the coordinate of such intersection. Such intersection of the line segments is checked for all the combinations of each line segment of the reference outline data and that of the object outline data. If the maximum or minimum coordinate of a line segment of the reference outline data is present between the maximum and minimum coordinates of a line segment of the object outline data, namely if the two line segments mutually overlap, there is temporarily judged that the line segments have an intersection, and, in such case, the intersection of the two line segments is determined.

If the intersection is contained in the two line segments as shown in FIG. 9, there is finally judged the presence of the intersection. On the other hand, if the intersection is positioned outside the line segments as shown in FIG. 10, such intersection is not qualified. The intersection is checked for all the line segments of the reference outline data and those of the object line data, and, for any intersection thus found, there is calculated the coordinate of such intersection.

Then a step S9 discriminates whether an intersection is found in the step S8 between the reference outline data and the object outline data. In case at least an intersection is found, the sequence proceeds to a step S10 for effecting a re-connection process. Also in case the step S7 identifies the presence of an intersection but the actual checking of the line segments in the step S8 identifies the absence of the intersection (as in the case shown in FIG. 11), the sequence proceeds also to the step S12.

The step S10, executed in case the reference and object outline data have an intersection, executes re-connection of the two outline data by adding the intersection determined in the step S8.

The mode of such re-connection is shown in FIGS. 12A to 12C and FIGS. 13A to 13D.

In the example shown in FIG. 12A, the intersection of the line segment DA of the reference outline data (ABCD) and the line segment EF of the object outline data (EFGH) is taken as α, that between the line segments BC and EF is taken as β, that between the line segments BC and GH is taken as γ, and that between the line segments DA and GH is taken as δ. These intersections are stored in the outline coordinate data table (FIG. 12C) in the sets of two each (for example α1, α2, β1, β2, γ1, γ2 etc.) because, for example in case of re-connecting line segments AB and CD having an intersection Z, such intersection A is required in each of the new sets of coordinate such as A→Z→D and C→Z→B. Also since only a start point and an end point is required for an outline after the re-connection of the outline data, the object outline data are re-connected in a loop form, as shown in FIG. 12C, by deleting the end point at No. 9 in the outline coordinate data table and connecting it to the start point. In practice the two outlines are re-connected as shown in FIGS. 13A to 13D.

FIG. 13A shows the method of re-connection of the line segment DA of the reference outline data (ABCD) and the line segment EF of the object outline data (EFGH) intersecting at α. A connection D→α1→F by connecting the start point D of the line segment of the reference outline data with the end point F of the line segment of the object outline data through the intersection α (α1). Also another connection E→α2 →A by connecting the start point E of the line segment of the object outline data with the end of point A of the line segment of the reference outline data through the intersection α (α2). Also the number of a next point and that of a preceding point are changed according to such re-connection.

More specifically, in the example shown in FIG. 13A, the "next point number" for the point D is changed to "10" indicating the point α1, while the "preceding point number" for the point α1 is changed to "3" indicating the point D, the "next point number" is similarly changed to "6" indicating the point F, and the "preceding point number" for the point F is changed to "10" indicating the point α1. Similarly the "next point number" for the point E is changed to "11" indicating the point α2, while the "preceding point number" for the point α2 is changed to "5" indicating the point E, the "next point number" is similarly changed to "4" indicating the point A, and the "preceding point number" for the point A is changed to "11" indicating the point α2.

FIG. 13B shows the re-connection of the line segment BC of the reference outline data and that EF of the object outline data shown in FIG. 12A. Since the line segment EF is already divided into line segments E α2 and α1F, the line segment α1F containing the intersection is selected as the line segment of the object outline data. Then the line segments BC, α1F and the intersection β are re-connected as B→β1→F and α1→β2→C. Then the number of the next point and that of the preceding point are changed according to such re-connection.

Similarly FIG. 13C shows the re-connection of the line segment BC of the reference outline data and that GH of the object outline data. The line segment β2C of the reference outline data and that GH of the object outline data having the intersection γ are re-connected as β2→γ1→H and G→γ2 C. Also the outline coordinate data table is modified according to such re-connections. Finally, as shown in FIG. 13D, there is executed the re-connection of the line segment DA of the reference outline data and that GH of the object outline data. The line segment Dα1 of the reference outline data and that γ1H of the object outline data are re-connected as D→δ1→H and γ1→δ2→α1, and the outline coordinate data table is modified according to such re-connections as shown in FIG. 13D, which shows the outline coordinate data table after the re-connecting operation in the step S10.

Then a step S11 executes deletion of the registration of the outline that has vanished by the re-connection in the step S10 or addition of the registration of the outline that has newly generated. In the above-explained example, as the step S10 has generated a connection A→B→β1→F→G→γ2→C→D→δ1→H→E→α2→A, the object outline data E→F→G→H are absorbed in the reference outline data. Consequently, for indicating that the reference outline data have vanished, the start point number and the end point number of the object outline data are changed to (−1) as shown in FIG. 14B.

Also there has been generated a new outline α1→β2→γ1→δ, not belonging to the above-mentioned outline, has been generated. Since the state shown in FIG. 13D is a loop without the start point or the end point, the new outline is registered by selecting one of the points as the start point and adding an end point. The registration of such new outline is made at the end of the outline data management information portion. Then the rotating direction and the maximum and minimum coordinates of this outline are checked and registered as shown in FIGS. 14B and 14C. The steps S7 to S11 are to change the connections of the reference outline data (ABCD) and the object outline data (EFGH), and the process for the data of an object outline is thus completed.

Then a step S12 searches a next candidate of the object outline data, for example by checking if other outline data are present after the object outline data processed in the step S11. If present, a step S13 identifies that the object outline data have not been exhausted and the sequence proceeds to a step S14. On the other hand, if absent, the step S13 identifies that the object outline data have been exhausted and the sequence proceeds to a step S15. The step S14 registers the object outline data searched in the step S12 as the outline data to be newly checked, and the sequence then returns to the step S7, in order to check the intersection with the reference outline data and to execute re-connections if the intersection is present. In the search for the object or reference outline data in the step S12 or S15, such data are judged as present if the start and end point values are not (−1). In case these values are (−1), the outline data are identified as having vanished and the search is continued for the next outline data.

A step S17 registers the reference outline data, searched in the step S15, as the outline data to be newly checked, and the sequence returns to the step S6 in order to check the intersection with the object outline data and to execute re-connection if any intersection is found. Finally a step S18 outputs the outline data, determined up to the step S16, as the entire outline data not involving intersection. Such non-intersecting entire outline data do not necessarily include all the outlines registered in the outline data management information portion. In the example shown in FIG. 14A, the outline (A→B→β1→F→G→γ2→C→D→δ1→H→E→α2→A is an outline to be finally registered, but the outline α1→β2→γ1→δ2 is not to be finally registered, but the outline α1→β2 →γ1→δ2 is not to be finally registered. The distinction of such outlines is executed in the following manner.

The number of the outlines initially registered in the outline data information portion is memorized, and, among the outline data finally registered in positions not exceeding such number, those not showing inversion of the rotating direction (A→B→β1→F→G→γ2→C→D→δ1→H→E→α2 in the example shown in FIG. 14A) are judged as the data to be registered. Among those registered in positions exceeding the above-mentioned number, namely among those newly registered, those showing inversion of the rotating direction alone are judged as the data to be registered. In the example shown in FIG. 14A, no data correspond to such definition.

As another example, the outline data group shown in FIGS. 15A and 15B has an initial number of the outlines is 4. The first outline data are composed of point numbers 0 to 4, the second outline data of point numbers 5 to 9, the third outline data of point numbers 10 to 14 and the fourth outline data of point numbers 15 to 19. The processing of these outline data according to the above-explained algorithm finally provides data shown in FIGS. 16A and 16B. In this case, since the number of the initial outlines is 4, the condition of being registered in a position not exceeding the initial number and not showing the inversion of the rotating direction is met only by the initial outline. Also the condition of being registered in a position exceeding the initial number and showing the inversion of the rotating direction is only by the final outline. Consequently these two outlines only are finally registered, and there can be generated the non-intersecting entire outline data, as shown in FIG. 17.

A step S19 executes a process, as will be explained later according to the flow chart shown in FIG. 23, of extracting the data to be converted into the curve data from the group of the straight line data extracted in the step S18 and converting thus extracted data into the curve data.

It is therefore possible to generate the non-intersecting data from the intersection-involving outline data, by detecting the intersection of the outlines, reconnecting the mutually intersecting outlines and finally extracting the necessary data only.

Figure 23:
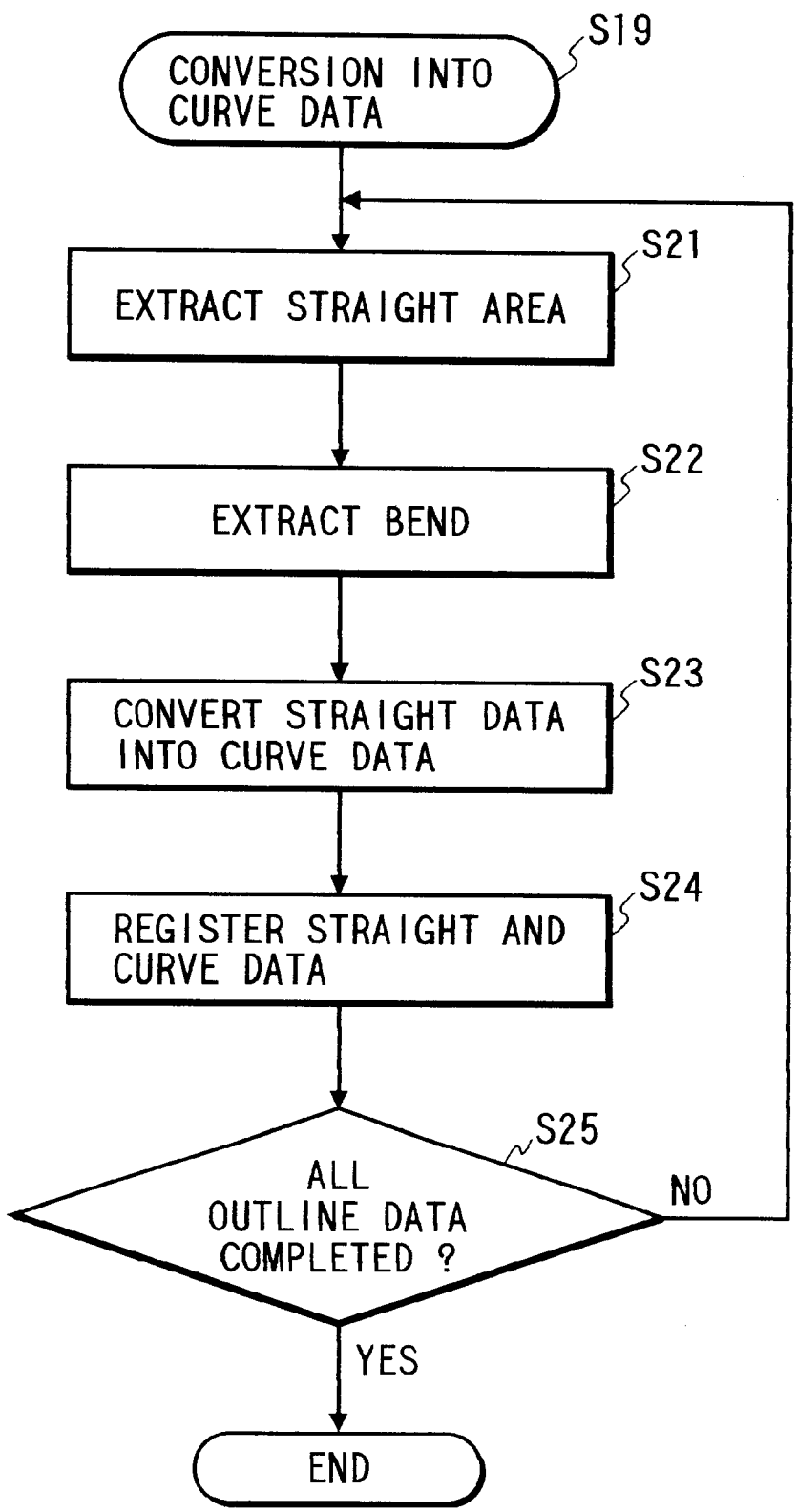
FIG. 23 is a flow chart for generating curve data from straight line data.

Now reference is made to the flow chart in FIG. 23, for explaining the conversion process into the curve data in the step S19 in FIG. 22.

Figure 24:
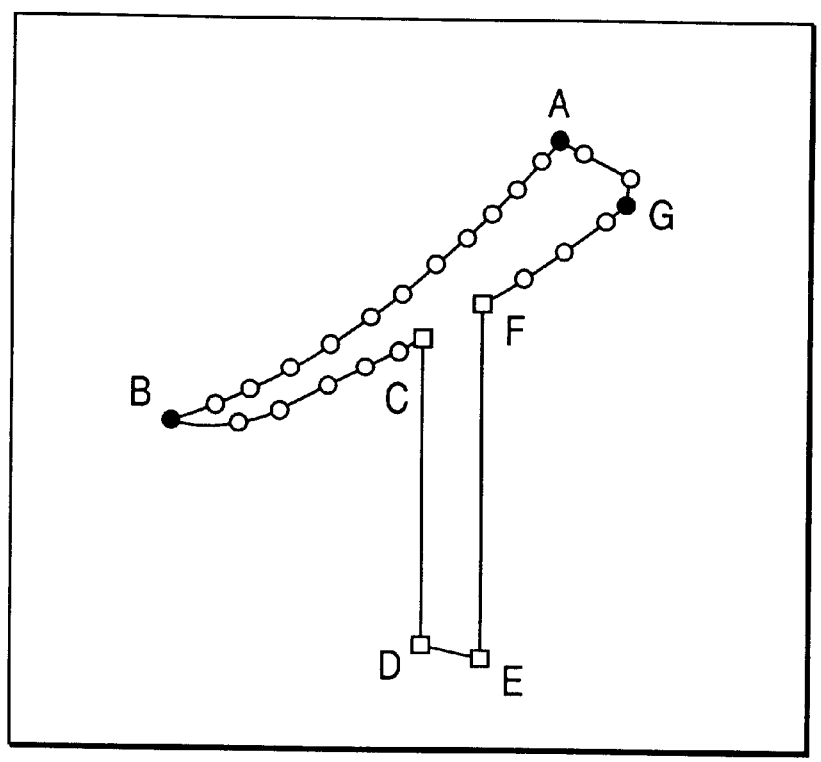
FIG. 24 is a view showing a character composed of straight line data generated from curve data.

A step S21 extracts curve areas and straight segment areas from the data registered as a group of straight lines. The identification of a straight segment area is achieved by identifying the points at the end of a line segment as the end points, in case the length of such line segment exceeds a certain threshold value. In an example shown in FIG. 24, squares are judged as the end points of straight segments. After the extraction of the straight segments from the points of the object outline, the sequence proceeds to a step S22, which identifies areas which can be represented by a curve equation, among the curve areas. This process is executed to extract a bend position where the direction of the points shows a steep change in the curve areas. This process is achieved by detecting the direction between the two neighboring points, and extracting a point where such detected direction differs from the direction to a next neighboring point beyond a certain threshold angle. In the example shown in FIG. 24, black circles indicate the end points of curves. The curve areas and the straight areas are extracted in this manner. In the example shown in FIG. 24, an area from the point A to the point B is judged as a curve area, an area from B to C is judged as a curve area, an area from C to D is judged as a straight area, an area from D to E is judged as a straight area, an area from E to F is judged as a straight area, an area from F to G is judged as a curve area, and an area from G to A is judged as a curve area.

Figure 25:
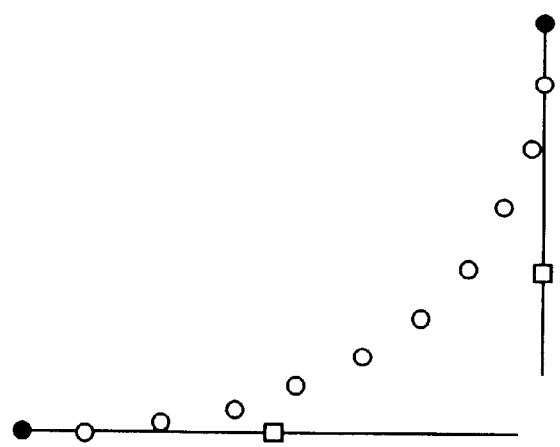
FIG. 25 is a view showing the mode of generating curve data from straight line data.

A step S23 effects approximation by applying a desired curve equation to the group of straight data judged as a curve area in the foregoing process. Various curve equations may be employed for such approximation, such as a second-order B-Spline curve equation, a second-order Bezier curve equation, a circular are equation a third-order Spline curve equation or a third-order Bezier curve equation. For example, in case a group of straight line segments as shown in FIG. 7 is represented by a third-order Bezier curve equation, there is at first determined, as shown in FIG. 25, a straight line passing through the end point and an immediately adjacent point, and there are calculated the positions of the control points of the third-order curve on the extension of such straight line. In the illustrated example, as shown in FIG. 7, a Bezier decomposition provides 7 points, while two decompositions provide 13 points, and n decompositions provide $(3 \times 2^n + 1)$ points. Thus, for the number x of the points contained in a single curve area, there is determined an integer n satisfying a relation:

$$(3 \times 2^{n-1} + 1) < x < (3 \times 2^n + 1),$$

and the control point is placed, on the extension of the straight line passing through the end point and the immediately adjacent point, at a distance corresponding to $2^n$ times of the distance of these two points.

In the example shown in FIG. 25, x=10 so that the integer n satisfying the above-mentioned relation is determined as "2". Consequently the control points are placed at positions (□) corresponding to 4 times of the distance between the end point and the adjacent point, whereby the conversion from the group of straight segments into the control points of a curve is rendered possible.

A step S24 provides a new set of points defining the outline, consisting of the end points of the straight segments determined in the step S22, and the end points and the control points of the curve areas determined in the step S23. As the straight segment data and the curve data are generated, it is necessary to attach an identification flag to the data for the purpose of distinction.

Figures 26A, 26B:
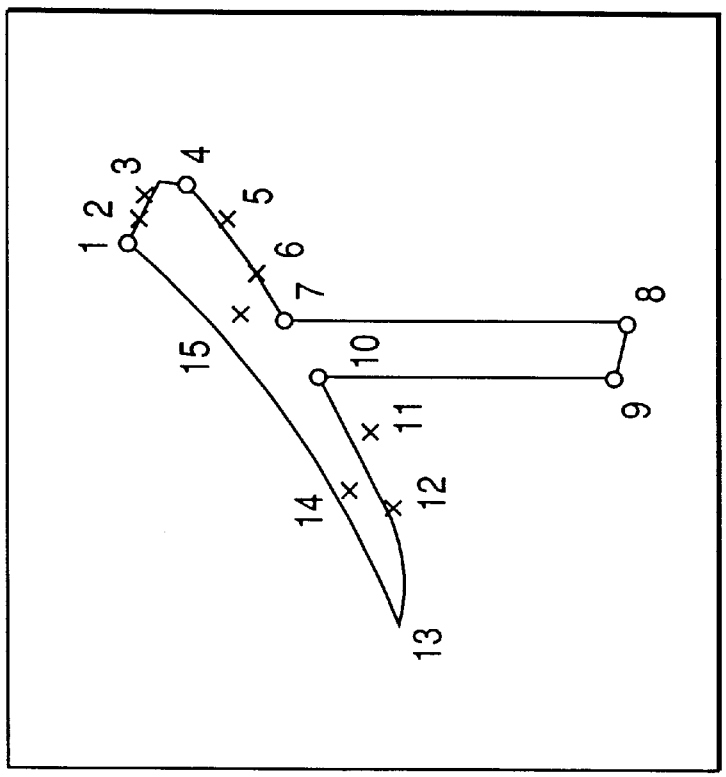
FIGS. 26A and 26B are views showing the state of distinction between straight line data and curve data.

As end points ○ are control points x are provided for the curves as shown in FIG. 26A, a flag "0" is attached the end point and a flag "1" is attached to the control point as shown in FIG. 26B.

Then a step S25 discriminates whether outline data to be processed are still present, and, if present, the sequence returns to the step S1 to effect again the conversion of the group of the straight data into the group of the straight and curve data. If such data are not present, the sequence is terminated.

As explained in the foregoing, it is rendered possible to find the curve outline data from the group of the straight outline data.

The present invention is applicable not only to a system composed of plural equipment (such as a host computer, an interface device, a reader, a printer etc.) but also to an apparatus consisting of a single equipment (such as a copying machine or a facsimile apparatus).

Also the objects of the present invention may be attained by providing the system or the apparatus with a memory medium storing program codes of a software realizing the function of the foregoing embodiments, and reading and executing the program codes stored in such memory medium by a computer (or a CPU or an MPU) of such system or apparatus.

In such case the program codes themselves read from the memory medium realize the functions of the foregoing embodiments, and the memory medium storing the program codes constitutes the present invention.

The memory medium for supplying the program codes can be, for example, a floppy disk, a hard disk, an optical disk, a magnetooptical disk, a CD-ROM, a CD-R, a magnetic tape, a non-volatile memory card or a ROM.

Also in addition to the case where the functions of the foregoing embodiments are attained by the execution of the read program code by the computer, the present invention also includes a case where the actual processes or a part thereof is executed by the operating system or the like functioning on the computer, according to the instructions of such program codes.

Furthermore, the present invention includes a case where the program codes read from the memory medium are stored in a memory provided in a function expanding board inserted into the computer or a function expanding unit provided therein, and the actual processes or a part thereof is executed by the CPU provided in such function expanding board or unit according to the instructions of such program codes to attain the functions of the foregoing embodiments.

The foregoing embodiment of the present invention, as explained in the foregoing, executes detection of the intersection after generation of the straight segment from the curve data, thereby generating the outline coordinates of the non-intersecting entire outline, from the coordinate data of intersection-involving strokes, at a high speed.

It is also rendered possible to generate, from the intersection-involving stroke data consisting of outline data of stroke units, the non-intersecting outline coordinates, at a high speed and with high image quality.

It is also rendered possible to generate, from the intersection-involving stroke data consisting of data of a core line and widths, the outline coordinates not involving intersection, at a high speed and with high image quality.

As explained in the foregoing, the present invention allows to generate the non-intersecting entire outline data, from the stroke data involving intersection.

Also the present invention provides an advantage of enabling generation of an image pattern of high quality at a high speed.

What is claimed is:

1. An outline data processing apparatus, comprising:
   a first setter arranged to set a reference outline and an object outline;
   a line segment discriminator arranged to discriminate whether line segments of the reference outline and object outline set by said first setter have an intersection with one another;
   a register unit arranged to change the reference outline and object outline set by said first setter to form at least one closed outline and register the at least one closed outline if said line segment discriminator discriminates that the line segments have an intersection with one another; and
   a second setter arranged to set a next object outline if said line segment discriminator discriminates that the line segments have no intersections with one another.

2. An apparatus according to claim 1, further comprising an outline discriminator arranged to discriminate whether the reference outline and the object outline set by said first setter have an intersection with one another, wherein said line segment discriminator is enabled if said outline discriminator discriminates that the reference outline and the object outline have an intersection with one another, and said second setter is enabled if said outline discriminator discriminates that the reference outline and the object outline have no intersections with one another.

3. An apparatus according to claim 2, wherein said outline discriminator discriminates that the reference outline and the object outline set by said first setter have an intersection, if a line segment of the reference outline has a maximum or minimum value that exists between maximum and minimum coordinates of a line segment of the object outline.

4. An apparatus according to claim 1, wherein the reference outline and the object outline include character data.

5. An apparatus according to claim 1, further comprising a straightening unit arranged to straighten curve data.

6. An outline data processing method comprising the steps of:
   a first setting step of setting a reference outline and an object outline;
   a line segment discriminating step of discriminating whether line segments of the reference outline and object outline set in said first setting step have an intersection with one another;
   a registering step of changing the reference outline and object outline set in said first setting step to form at least one closed outline and registering the at least one closed outline if said line segment discriminating step discriminates that the line segments have an intersection with one another; and
   a second setting step of setting a next object outline if said line segment discriminating step discriminates that the line segments have no intersection.

7. A method according to claim 6, further comprising an outline discriminating step of discriminating whether the reference outline and the object outline set in said first setting step have an intersection with one another, wherein said line segment discriminating step is enabled if said outline discriminating step discriminates that the reference outline and the object outline have an intersection with one another, and said second setting step is enabled if said outline discriminating step discriminates that the reference outline and the object outline have no intersections with one another.

8. A method according to claim 7, wherein said outline discriminating step discriminates that the reference outline and the object outline set in said first setting step have an intersection, if a line segment of the reference outline has a maximum or minimum value that exists between maximum and minimum coordinates of a line segment of the object outline.

9. A method according to claim 6, wherein the reference outline and the object outline include character data.

10. A method according to claim 6, further comprising a straightening step of straightening curve data.

11. A memory medium storing computer-readable instructions for performing an outline data processing method, the method comprising the steps of:
    a first setting step of setting a reference outline and an object outline;
    a line segment discriminating step of discriminating whether line segments of the reference outline and object outline set in said first setting step have an intersection with one another;
    a registering step of changing the reference outline and object outline set in said first setting step to form at least one closed outline and registering the closed outline if said line segment discriminating step discriminates that the line segments have an intersection with one another; and a second setting step of setting a next object outline if said line segment discriminating step discriminates that the line segments have no intersection.

12. A program product which includes computer-readable code for executing an outline data processing method, the method comprising the steps of:

a first setting step of setting a reference outline and an object outline;

a line segment discriminating step of discriminating whether line segments of the reference outline and object outline set in said first setting step have an intersection with one another;

a registering step of changing the reference outline and object outline set in said first setting step to form at least one closed outline and registering the closed outline if said line segment discriminating step discriminates that the line segments have an intersection with one another; and a second setting step of setting a next object outline if said line segment discriminating step discriminates that the line segments have no intersection.

* * * * *

UNITED STATES PATENT AND TRADEMARK OFFICE
CERTIFICATE OF CORRECTION

PATENT NO. : 6,266,444 B1
DATED : July 24, 2001
INVENTOR(S) : Masayuki Yoshida

It is certified that error appears in the above-identified patent and that said Letters Patent is hereby corrected as shown below:

Column 2,
Line 61, "areas" should read -- area --.

Column 3,
Line 36, "CD-ROM 93" should read -- CD-ROM 93, --.

Column 4,
Line 9, "information etc." should read -- information, etc., --.

Column 5,
Line 23, "discriminates" should read -- discriminated --;
Line 56, "in" should read -- of --.

Column 6,
Line 5, "E α2" should read -- Eα2 --; and
Line 39, "outline, has been generated." should read -- outline. --.

Column 7,
Line 7, "output" should read -- outputs --;
Line 22, "α2→" should read -- α2→A --.

Column 9,
Line 47, "lines" should read -- line --.

Column 11,
Line 11, "γ2 etc." should read -- γ2, etc. --;
Line 25, "by" should read -- is formed by --;
Line 29, "by" should read -- is formed by --;
Line 51, " E α2" should read -- Eα2 --;
Line 62, "G→γ2 C." should read -- G→γ2→C. --.

Column 12,
Line 17, "Also there has been generated" should read -- Also, --;
Line 60, "finally" should be deleted;
Line 61 should be deleted.

UNITED STATES PATENT AND TRADEMARK OFFICE
CERTIFICATE OF CORRECTION

PATENT NO.     : 6,266,444 B1
DATED          : July 24, 2001
INVENTOR(S)    : Masayuki Yoshida It is certified that error appears in the above-identified patent and that said Letters Patent is hereby corrected as shown below:

Column 13,
Line 3, "α2→" should read -- α2→A --.

Column 14,
Line 4, "are equation" should read -- area equation, --;
Line 37, "are" (first occurrence) should read -- and --;
Line 52, "printer" should read -- printer, --.

Signed and Sealed this

Eleventh Day of March, 2003

JAMES E. ROGAN
*Director of the United States Patent and Trademark Office*